United States Patent
Sexson et al.

(10) Patent No.: US 12,446,969 B2
(45) Date of Patent: Oct. 21, 2025

(54) ROBOT MOUNTED CAMERA REGISTRATION AND TRACKING SYSTEM FOR ORTHOPEDIC AND NEUROLOGICAL SURGERY

(71) Applicants: ICAHN SCHOOL OF MEDICINE AT MOUNT SINAI, New York, NY (US); MONOGRAM ORTHOPAEDICS INC., Austin, TX (US)

(72) Inventors: Benjamin Sexson, Laguna Hills, CA (US); Douglas B. Unis, Brooklyn, NY (US); Matthew Dicicco, Brooklyn, NY (US); Brian Jin, New York, NY (US)

(73) Assignees: ICAHN SCHOOL OF MEDICINE AT MOUNT SINAI, New York, NY (US); MONOGRAM ORTHOPAEDICS, INC., Austin, TX (US)

( * ) Notice: Subject to any disclaimer, the term of this patent is extended or adjusted under 35 U.S.C. 154(b) by 646 days.

(21) Appl. No.: 17/456,989

(22) Filed: Nov. 30, 2021

(65) Prior Publication Data
US 2022/0079687 A1    Mar. 17, 2022

Related U.S. Application Data

(63) Continuation of application No. PCT/US2020/035408, filed on May 29, 2020, and a
(Continued)

(51) Int. Cl.
*A61B 34/20* (2016.01)
*A61B 34/30* (2016.01)

(52) U.S. Cl.
CPC .............. *A61B 34/20* (2016.02); *A61B 34/30* (2016.02); *A61B 2034/2057* (2016.02); *A61B 2034/2068* (2016.02)

(58) Field of Classification Search
CPC . A61B 34/20; A61B 34/30; A61B 2034/2057; A61B 2034/2068; A61B 2034/2055; A61B 34/35
See application file for complete search history.

(56) References Cited

U.S. PATENT DOCUMENTS 9,119,655 B2    9/2015    Bowling et al.
9,119,665 B2    9/2015    Ahern et al.
(Continued)

FOREIGN PATENT DOCUMENTS

DE    102013211698 A1 *  12/2014    ......... A61B 1/00149
WO    2020236937 A1    11/2020
WO    2020243631 A1    12/2020

OTHER PUBLICATIONS

DE-102013211698-A1 translation (Year: 2014).*
(Continued)

*Primary Examiner* — Kyle T Johnson
(74) *Attorney, Agent, or Firm* — Heslin Rothenberg Farley & Mesiti P.C.

(57) ABSTRACT

A surgical method includes, for example, tracking, via at least one camera attached to a robotic arm of a surgical robot, a surgical site of a patient, the robotic arm having a plurality of joints and a plurality of body parts, controlling the robotic arm to perform a surgical procedure at the surgical site of the patient based on the camera tracked surgical site of the patient, and wherein the tracking comprises controlling the movement of the plurality of joints and
(Continued)

body parts of the robotic arm to maintain a line of sight of the at least one camera directed towards the surgical site of the patient.

35 Claims, 27 Drawing Sheets

Related U.S. Application Data continuation-in-part of application No. PCT/US2020/033810, filed on May 20, 2020.

(60) Provisional application No. 62/854,648, filed on May 30, 2019, provisional application No. 62/850,050, filed on May 20, 2019.

(56) References Cited

U.S. PATENT DOCUMENTS

| | | | |
|---|---|---|---|
| 9,439,556 B2 | 9/2016 | Pandya et al. | |
| 9,603,665 B2 | 3/2017 | Bowling et al. | |
| 9,668,768 B2* | 6/2017 | Piron | A61B 34/30 |
| 9,788,903 B2 | 10/2017 | Kim et al. | |
| 10,512,509 B2 | 12/2019 | Bowling et al. | |
| 2004/0106916 A1* | 6/2004 | Quaid | A61B 34/71 |
| | | | 606/1 |
| 2006/0184275 A1 | 8/2006 | Hosokawa et al. | |
| 2011/0270443 A1 | 11/2011 | Kamiya et al. | |
| 2013/0010081 A1* | 1/2013 | Tenney | H04N 13/20 |
| | | | 348/47 |
| 2013/0331644 A1 | 12/2013 | Pandya et al. | |
| 2014/0107471 A1* | 4/2014 | Haider | A61B 5/1076 |
| | | | 606/82 |
| 2014/0200621 A1* | 7/2014 | Malackowski | A61B 34/70 |
| | | | 606/86 R |
| 2014/0275760 A1 | 9/2014 | Lee et al. | |
| 2014/0316434 A1 | 10/2014 | Simaan et al. | |
| 2016/0058521 A1 | 3/2016 | Liang et al. | |
| 2016/0113728 A1* | 4/2016 | Piron | A61B 34/30 |
| | | | 606/130 |
| 2016/0338782 A1 | 11/2016 | Bowling et al. | |
| 2017/0056116 A1 | 3/2017 | Kostrzewski | |
| 2017/0071692 A1 | 3/2017 | Taylor et al. | |
| 2017/0258526 A1* | 9/2017 | Lang | A61B 17/1775 |
| 2017/0265943 A1* | 9/2017 | Sela | A61B 34/20 |
| 2017/0312031 A1* | 11/2017 | Amanatullah | A61B 34/10 |
| 2017/0333137 A1* | 11/2017 | Roessler | A61B 17/1703 |
| 2018/0000546 A1 | 1/2018 | Crawford et al. | |
| 2018/0297206 A1* | 10/2018 | Larkin | A61B 34/10 |
| 2019/0090965 A1* | 3/2019 | Farritor | A61B 34/30 |
| 2019/0142518 A1 | 5/2019 | Viscardi et al. | |
| 2019/0142520 A1 | 5/2019 | VanDyken | |
| 2019/0290370 A1* | 9/2019 | Brummund | A61B 90/13 |
| 2019/0314097 A1* | 10/2019 | Diolaiti | A61B 17/00 |
| 2019/0365481 A1* | 12/2019 | Otto | A61B 34/25 |
| 2021/0137634 A1* | 5/2021 | Lang | A61B 34/20 |
| 2022/0079687 A1* | 3/2022 | Sexson | A61B 34/20 |
| 2022/0125526 A1* | 4/2022 | Wald | A61B 34/10 |
| 2023/0126611 A1* | 4/2023 | Itotani | A61B 90/25 |
| | | | 606/130 |
| 2023/0157525 A1* | 5/2023 | Hunter | A61B 1/045 |
| | | | 600/102 |
| 2023/0415353 A1* | 12/2023 | Oba | G05B 19/41825 |

OTHER PUBLICATIONS

Partial Supplementary European Search Report for European Application No. 20813577.2 dated Jun. 27, 2023, 18 pages.

Partial Supplementary European Search Report for European Application No. 20809508.3 dated Jun. 15, 2023, 13 pages.

International Preliminary Report on Patentability for International Application No. PCT/US2020/035408, dated Nov. 16, 2021, 6 pages, International Bureau of WIPO.

Australian Patent Office, First Examination Report dated Jan. 10, 2022, 4 pages.

Sexson et al., International Search Report and Written Opinion for PCT/US2020/035408 (published as WO 2020/243631), titled "Robot Mounted Camera Registration and Tracking System for Orthopedic and Neurological Surgery", 8 pages, dated Jul. 30, 2020.

Sexson et al., International Search Report and Written Opinion for PCT/US2020/033810 (published as WO 2020/236937), titled "A System and Method for Interaction and Definition of Tool Pathways for a Robotic Cutting Tool", 14 pages, dated Oct. 23, 2020.

Wang et al., "Robot-assisted Occlusion Avoidance for Surgical Instrument Optical Tracking System", Proceeding of the 2015 IEEE International Conference on Information and Automation, 6 pages, Aug. 2015.

Sexson et al., U.S. Appl. No. 17/455,822, titled "A System and Method for Interaction and Definition of Tool Pathways for a Robotic Cutting Tool", 57 pages, filed Nov. 19, 2021.

Sexson et al., Examination Report, Australian Parent Application No. 2023200152, mailed Feb. 15, 2024, 5 pages, Feb. 15, 2024.

Sexson et al., Examination Report, European Parent Application No. 20813577.2, mailed Jun. 20, 2025, 6 pages, Jun. 20, 2025.

* cited by examiner

900 ↘

```
┌─────────────────────────────────────────────────────────┐
│   TRACKING, VIA AT LEAST ONE CAMERA ATTACHED TO A       │
│   ROBOTIC ARM OF A SURGICAL ROBOT, A SURGICAL SITE OF A │─ 910
│   PATIENT, THE ROBOTIC ARM HAVING A PLURALITY OF JOINTS │
│             AND PLURALITY OF BODY PARTS                 │
└─────────────────────────────────────────────────────────┘
                            │
┌─────────────────────────────────────────────────────────┐
│   CONTROLLING THE ROBOTIC ARM TO PERFORM A SURGICAL     │
│   PROCEDURE AT THE SURGICAL SITE OF THE PATIENT BASED ON│
│   THE CAMERA TRACKED SURGICAL SITE OF THE PATIENT, AND  │
│       WHEREIN THE TRACKING COMPRISES CONTROLLING        │─ 920
│   MOVEMENT OF THE PLURALITY OF JOINTS AND BODY PARTS OF │
│   THE ROBOTIC ARM TO MAINTAIN A LINE OF SIGHT OF THE AT │
│    LEAST ONE CAMERA DIRECTED TOWARDS THE SURGICAL SITE  │
│                      OF THE PATIENT                     │
└─────────────────────────────────────────────────────────┘
```

FIG. 27

ROBOT MOUNTED CAMERA REGISTRATION AND TRACKING SYSTEM FOR ORTHOPEDIC AND NEUROLOGICAL SURGERY

CROSS-REFERENCE TO RELATED APPLICATION

This application is a continuation of International Patent Application No. PCT/US2020/035408, filed on May 29, 2020, entitled "Robot Mounted Camera Registration And Tracking System For Orthopedic And Neurological Surgery" and published under the PCT Articles in English as WO 2020/243631 on Dec. 3, 2020, which International Patent Application perfects and claims priority benefit to U.S. Provisional Patent Application No. 62/854,648, filed May 30, 2019, entitled "Robot Mounted Camera Registration And Tracking System For Orthopedic And Neurological Surgery", which applications are hereby incorporated herein by reference in their entirety.

This application is also a continuation-in-part of International Patent Application No. PCT/2020/033810, filed May 20, 2020, entitled "A System And Method For Interaction And Definition Of Tool Pathways For A Robotic Cutting Tool" and published under the PCT Articles in English as WO 2020/236937 on Nov. 26, 2020, which international PCT patent application claims priority to U.S. Provisional Patent Application No. 62/850,050, filed May 20, 2019, entitled "A System And Method For Interaction And Definition Of Tool Pathways For A Robotic Cutting Tool", which applications are hereby incorporated herein by reference in their entirety.

TECHNICAL FIELD

The present disclosure generally relates to methods and systems for object tracking by a robot. More particularly, the present disclosure relates to surgical methods and robotic systems for tracking, marking, and registration by providing accurate object positions and interactive updates to changes in object positions and orientations for a surgical robot.

BACKGROUND

Cameras and trackers are used during surgery to position a robotic tool and to identify an object and surfaces for cutting. Two systems are currently in use for orthopedic and neurological surgery. The first system employs a dual camera system that projects infrared light and records the reflection from objects on the tools or reflective markers on the patient. The cameras are outside the surgical sphere and measure the patient's bone being operated on relative to markers affixed with surgical screws to the patient's bone. Problems with this system include, the cameras being far away and the possibility of occlusion being high. The markers have to be large in order to be visible by the cameras, requiring larger incisions and more screws to support the marker. In addition, registering positions for the robot may be time consuming because each individual position must be registered using a stylus to point to positions on the patient's bone.

The second system also employs an infrared sensitive camera, but which are mounted on pins inserted into the patient's pelvis on the iliac crest. Markers are positioned on the patient's femur or on tools used during the surgery. The second system minimizes the occlusion problem but may pose a danger to the patient since the camera is mounted in close proximity to the major vessels of the patient.

SUMMARY

Shortcomings of the prior art are overcome and additional advantages are provided through the provision, in one embodiment, of a surgical method, which includes, for example, tracking, via at least one camera attached to a robotic arm of a surgical robot, a surgical site of a patient, the robotic arm having a plurality of joints and plurality of body parts, controlling the robotic arm to perform a surgical procedure at the surgical site of the patient based on the camera tracked surgical site of the patient, and wherein the tracking comprises controlling movement of the plurality of joints and body parts of the robotic arm to maintain a line of sight of the at least one camera directed towards the surgical site of the patient.

In another embodiment, a surgical robotic system includes for example, a robot comprising a robotic arm having an end effector, the robotic arm having a plurality of joints and plurality of body parts, at least one camera operably attached to said robotic arm, a controller comprising a memory, one or more processors in communication with the memory, and program instructions executable by the one or more processors via the memory to perform a method, the method includes tracking, via at least one camera attached to the robotic arm of the surgical robot, a surgical site of a patient, controlling the robotic arm to perform a surgical procedure at the surgical site of the patient based on the camera tracked surgical site of the patient, and wherein the tracking comprises controlling movement of the plurality of joints and body parts of the robotic arm to maintain a line of sight of the at least one camera directed towards the surgical site of the patient.

In another embodiment, a computer program product includes, for example, a non-transitory computer readable storage medium readable by a processing circuit and storing instructions for execution by the processing circuit for performing a method, the method includes tracking, via at least one camera attached to a robotic arm of a surgical robot, a surgical site of a patient, controlling the surgical robot to perform a surgical procedure at the surgical site of the patient based on the camera tracked surgical site of the patient, and wherein the tracking comprises controlling movement of the plurality of joints and body parts of the robotic arm to maintain a line of sight of the at least one camera directed towards the surgical site of the patient.

These, and other objects, features and advantages of this present disclosure will become apparent from the following detailed description of the various aspects of the present disclosure taken in conjunction with the accompanying drawings.

BRIEF DESCRIPTION OF THE DRAWINGS

The present disclosure will be understood more fully from the detailed description given hereinafter and from the accompanying drawings of certain embodiments of the present disclosure, which, however, should not be taken to limit the present disclosure, but are for explanation and understanding only.

FIG. 27 is a flowchart of a surgical method, according to an embodiment of the present disclosure.

DETAILED DESCRIPTION OF THE INVENTION

Figure 1:
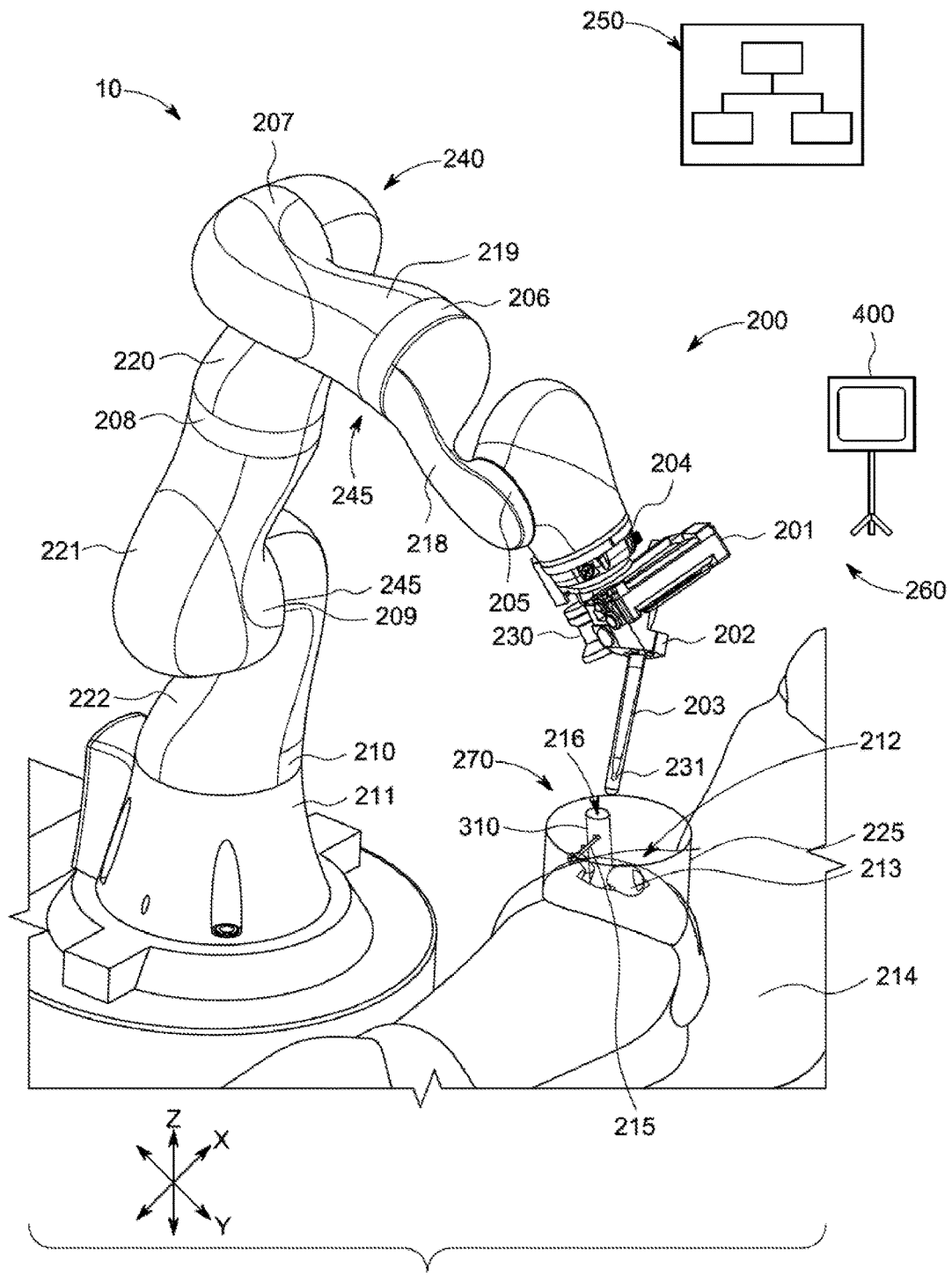
FIG. 1 is a perspective view of a surgical robotic system, according to an embodiment of the present disclosure.

The present disclosure will be discussed hereinafter in detail in terms of various exemplary embodiments according to the present disclosure with reference to the accompanying drawings. In the following detailed description, numerous specific details are set forth in order to provide a thorough understanding of the present disclosure. It will be appreciated, however, to those skilled in the art that the present disclosure may be practiced without these specific details. In other instances, well-known structures are not shown in detail to avoid unnecessary obscuring of the present disclosure.

Thus, the implementations described below are exemplary implementations provided to enable persons skilled in the art to make or use the embodiments of the present disclosure and are not intended to limit the scope of the present disclosure, which is defined by the claims. As used herein, the word "exemplary" or "illustrative" means "serving as an example, instance, or illustration." Any implementation described herein as "exemplary" or "illustrative" is not necessarily to be construed as preferred or advantageous over other implementations.

Furthermore, there is no intention to be bound by any expressed or implied theory presented in the preceding technical field, background, summary or the following detailed description. It is to be understood that the specific devices and processes illustrated in the attached drawings, and described in the following specification, are simply exemplary embodiments. Hence, specific dimensions and other physical characteristics relating to the embodiments disclosed herein are not to be considered as limiting.

In this detailed description and the following claims, the words proximal, distal, anterior or plantar, posterior or dorsal, medial, lateral, superior and inferior are defined by their standard usage for indicating a particular part or portion of a bone or implant according to the relative disposition of the natural bone or directional terms of reference. For example, "proximal" means the portion of a device or implant nearest the torso, while "distal" indicates the portion of the device or implant farthest from the torso. As for directional terms, "anterior" is a direction towards the front side of the body, "posterior" means a direction towards the back side of the body, "medial" means towards the midline of the body, "lateral" is a direction towards the sides or away from the midline of the body, "superior" means a direction above and "inferior" means a direction below another object or structure.

Similarly, positions or directions may be used herein with reference to anatomical structures or surfaces. For example, as the current systems and methods are described herein with reference to the use with the bones of the pelvis, and the femur, the identity of such bones may be used to describe the surfaces, positions, directions or orientations of the systems and methods. Further, the instrumentation and methods, and the aspects, components, features and the like thereof, disclosed herein are described with respect to one side of the body for brevity purposes. However, as the human body is relatively symmetrical or mirrored about a line of symmetry (midline), it is hereby expressly contemplated that the instrumentation and methods, and the aspects, components, features and the like thereof, described and/or illustrated herein may be changed, varied, modified, reconfigured or otherwise altered for use or association with another side of the body for a same or similar purpose without departing from the spirit and scope of the present disclosure. For example, the instrumentation and methods, and the aspects, components, features and the like thereof, described herein with respect to the right hip may be mirrored so that they likewise function with the left hip. Further, the instrumentation and methods, and the aspects, components, features and the like thereof, disclosed herein are described with respect to the leg for brevity purposes, but it should be understood that the instrumentation and methods may be used with other bones of the body having similar structures.

The systems, methods, computer program products, and apparatus described are directed to surgical robot camera systems that may be operable to minimize occlusion and view obstruction, provide a safer surgical robot camera placement, provide more accurate marking of patient body features, and to provide a dynamic video feedback system for updating robot positioning during a surgical procedure.

The following description references systems, methods, computer program products, and apparatuses for cutting tools for orthopedic and/or neurological surgery involving a femur and the pelvic area. However, those possessing an ordinary level of skill in the relevant art will appreciate that other extremities, joints, and parts of the musculoskeletal system are suitable for use with the foregoing systems, methods, computer program products, and apparatuses. Likewise, the various figures, steps, procedures and workflows are presented only as an example and in no way limit the systems, methods, computer program products, or apparatuses described to performing their respective tasks or outcomes in different time-frames or orders. The teachings of the present disclosure may be applied to any orthopedic and/or neurological surgery such as on the shoulder, spine, elbow, foot, hand, and knee, and may be implemented in other treatments sites that have similar anatomical considerations.

In some embodiments, aspects of the present disclosure may take the form of a computer program product, which may be embodied as computer readable medium(s). A computer readable medium may be a tangible storage device/medium having computer readable program code/ instructions stored thereon. Example computer readable mediums include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, processing circuit, or the like, to obtain data (e.g., instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present disclosure, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Referring to FIG. 1, a surgical robotic system 10 may include a surgical robot 200, a control unit 250, and a user interface 260 (UI), according to an embodiment of the present disclosure. Control unit 250 may include at least one processor, at least one input/output device, at least one storage device or memory having at least one database as further described below. The control unit 250 may have a control algorithm for controlling, for example, a joint angle. The control algorithm may be a default control algorithm or include inputs from, for example, a Fast Robotic Interface.

The surgical robot 200 may include a base 211 and a plurality of body parts 240 and a plurality of joints 245. The plurality of joints 245 may include, for example, a flange 204, a first joint 205, a second joint 206, a third joint 207, a fourth joint 208, a fifth joint 209, and a sixth joint 210. The plurality of body parts 240 may include, for example, a first body part 217, a second body part 218, a third body part 219, a fourth body part 220, a fifth body part 221, and a sixth body part 222.

The sixth joint 210 may be connected to the base 211 and to the sixth body part 222, with, for example, the sixth body part 222 being rotatably movable at the sixth joint 210 about the base 211. The fifth joint 209 may be connected to the sixth body part 222 and to the fifth body part 221, with, for example, the fifth body part 221 and the sixth body part 222 being rotatably movable relative to each other about the fifth joint 209. The fourth joint 208 may be connected to the fifth body part 221 and the fourth body part 220, with, for example, the fifth body part 221 and the fourth body part 220 being rotatably movable relative to each other about the fourth joint 208. The third joint 207 may be connected to the fourth body part 220 and the third body part 219, with, for example, the fourth body part 220 and the third body part 219 being rotatably movable relative to each other about the third joint 207. The second joint 206 may be connected to the third body part 219 and the second body part 218, with, for example, the third body part 219 and the second body part 218 being rotatably movable relative to each other about the second joint 206. The first joint 205 may be connected to the second body part 218 and the first body part 217, with, for example, the second body part 218 and the first body part 217 being rotatably movable relative to each other about the first joint 205.

The base 211 may be fixed to, for example, a cart or the ground, such that the base 211 may provide a fixed frame of reference for defining the position, orientation, and motion of the plurality of joints 245 and the plurality of body parts 240 relative to the base 211. The base 211 may be used to define a frame of reference, such as, for example, a set of three-dimensional axes (e.g., x, y, z), which may be used to define positions, orientations, and motions of the surgical robot 200 and of objects relative to the surgical robot 200. A frame of reference defined relative to the base 211 may also be known as a world frame, a base, a base frame, a frame, or a tool frame. If the position and orientation of an object may be defined or calculated in relation to a position relative to the world frame, the object becomes defined in the same frame of reference as the surgical robot 200, and the surgical robot 200 may calculate the position and orientation of the object. As such, the surgical robot 200 may programmably interact with the defined objects, positions, and/or orientations.

Referring further to FIG. 1, since the position, orientation, and motion of the plurality of joints 245 and the plurality of body parts 240 relative to the base 211 may be defined, and the flange 204 may be connected to the first body part 217 and to an end effector 202, the position, and orientation of the flange 204 and the end effector 202 may be calculated. The first body part 217 and the end effector 202 may be rotatably movable relative to each other about the flange 204, and thus their motion may also be determined. The flange 204 may also be referred to as, for example, a mounting flange, surgical robot arm flange, or output flange, and may represent a mounting member at the proximate tip of the first body part 217 of the surgical robot 200.

Connected to the end effector 202 may be a tool 203, a control handle 201, and a camera 230, according to an embodiment of the present disclosure. By virtue of connection with the end effector 202, the position, orientation, and motion of the tool 203, the control handle 201, and the camera 230 may be determined, if the position, orientation, and motion of the end effector 202 may be determined. If the position, orientation, and motion of the tool 203 may be determined, the position, orientation, and motion of a tool tip 231 may also be determined. It is understood that the tool 203 is configured for cutting bone, however the tool 203 may be replaceable with non-cutting implements that may function as, for example, a marking device or a viewing device.

The position, orientation, and motion of each of the plurality of joints 245 and each of the plurality of body parts 240 that are components of the surgical robot 200, may be calculated and determined relative to the base 211. The position and orientation of objects external to the surgical robot 200, such as a marker 215 (best shown in FIG. 2) may be determined if the object is within the field of view of the camera 230. The object's position and orientation may be determined relative to the camera 230. The position and orientation of the camera 230 may be defined because the position and orientation of the components of the surgical robot 200 may be determined. If the position, orientation, and motion of each of the plurality of joints 245 and each of the plurality of body parts 240 are determined relative to the base 211, then the position and orientation of an external object may be calculated for surgical robot interaction. Similarly, the definition of an external position and orientation relative to the base 211, may make that position and orientation defined relative to the surgical robot 200 such that the surgical robot 200 may interact with the defined external position.

Figure 2:
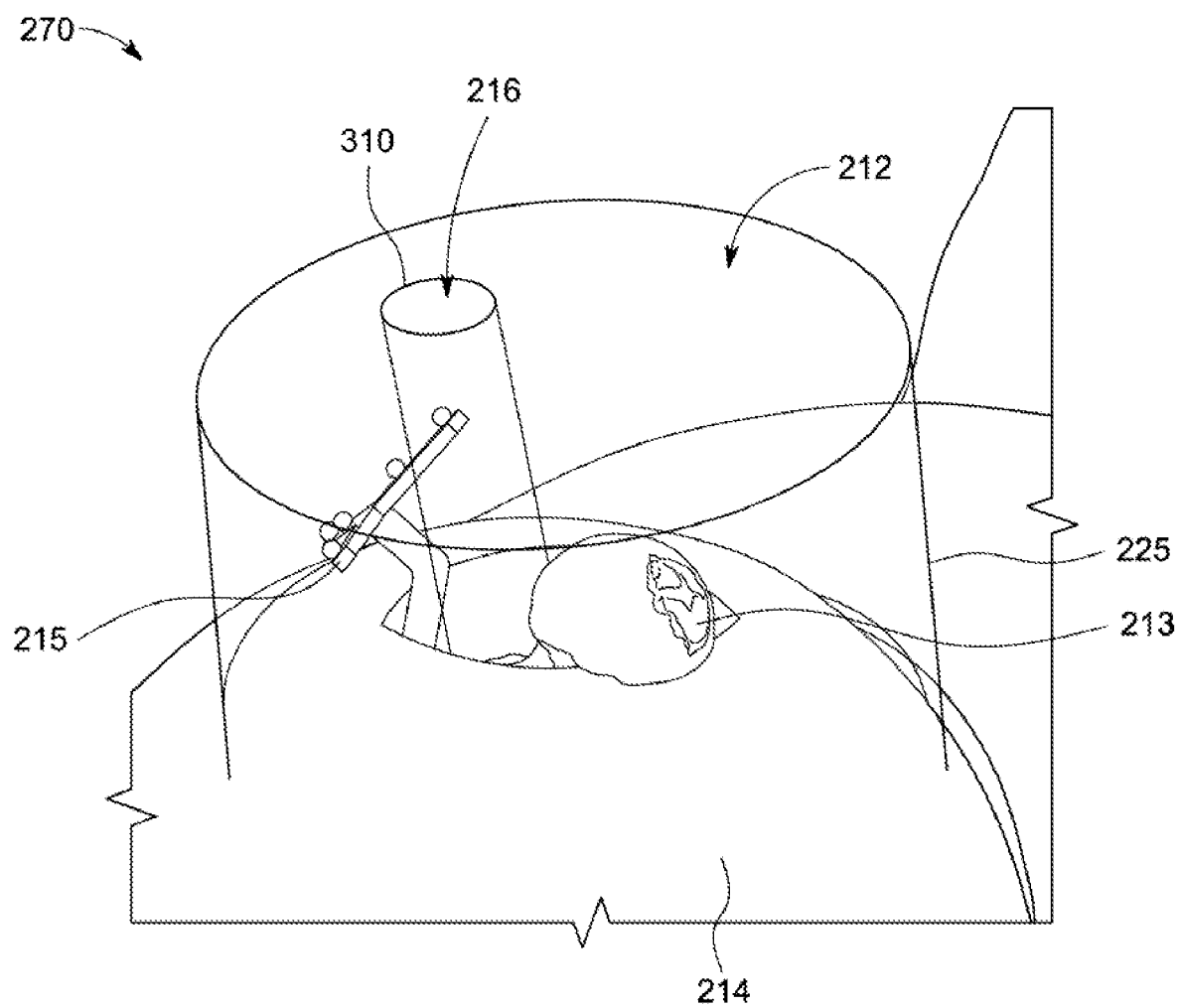
FIG. 2 is an enlarged perspective view of the surgical site and illustrated boundary zones of FIG. 1, according to an embodiment of the present disclosure.

With reference to FIG. 2, a surgical site 223 of a patient 214 is show along with an illustration of a defined cutting zone or a go zone 216 and a no-go zone 212, according to an embodiment of the present disclosure. The marker 215 is shown inserted into the patient 214 in a surgical site 223 near a femur 213, and protruding from the surgical site 223. The marker 215 may also be referred to as a position marker or reference marker. The surgical site 223 may be understood to be the area where surgery is being performed on the patient 214. The marker 215 may be used, for example, to define positions and orientations on the femur 213 or on the patient 214, relative to the marker 215, such that if the position and orientation of the marker 215 is definable relative to the base 211 (FIG. 1), then the positions and orientations defined on the femur 213 or on the patient 214 may be calculable relative to the base 211. If, for example, the positions and orientations on the femur 213 or the patient 214 are defined relative to the base 211 (FIG. 1), then the surgical robot 200 may act on positions and orientations on the femur 213 or the patient 214.

Figure 3:
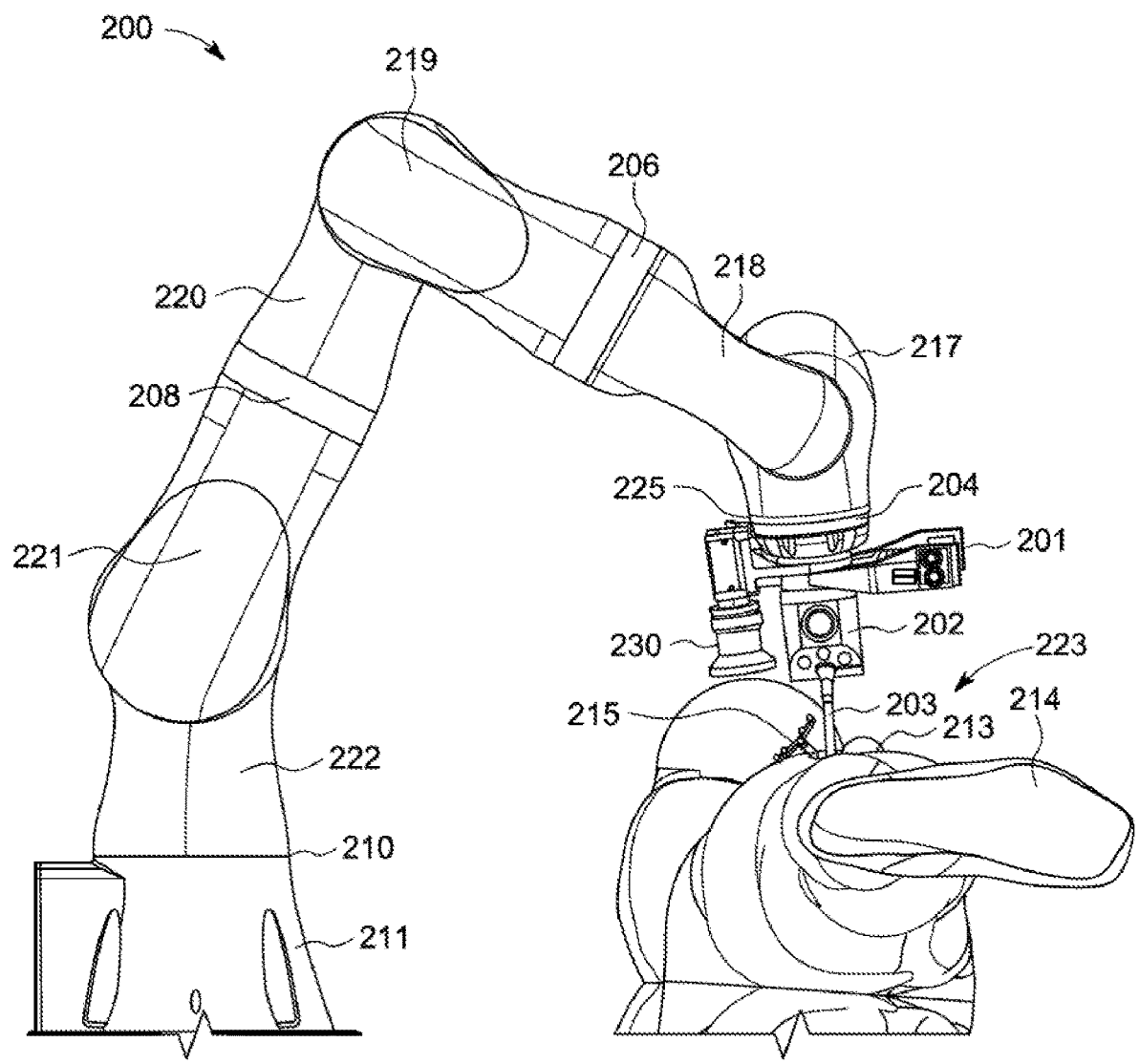
FIG. 3 is an enlarged, side elevational view of the surgical robot and the patient of FIG. 1, according to an embodiment of the present disclosure.

As shown in FIG. 3, the surgical robot 200 with the camera 230 mounted to the flange 204, may be positioned with the camera 230 facing the surgical site of the patient 214. The surgical robot 200 may be connected to the base 211. The camera 230 may use a camera mount 225 to connect to the flange 204. As illustrated in FIG. 3, the marker 215 may be connected to the patient 214, with the femur 213 shown protruding from the patient 214. The camera 230 may be, for example, a single two-dimensional monocular camera, as shown in this embodiment, or alternately, it may include multiple two-dimensional stereo cameras. The camera 230 may also be a three-dimensional tracking system, such as, for example, a laser scanner, a structured light scanner, or the equivalent. The camera 230 may be mounted at an offset from the flange 204 and the end effector 202. Additionally, the camera 230 may be angled. Positioning the camera 230 at an offset and further angling the camera 230 towards the tool 203, may provide for simultaneous end effector 202 and/or tool 203 and/or marker 215 viewing. Although the tool 203 may be off-center in the field of view of the camera 230, a camera image of both the tool 203 and the marker 215 in the same field of view may provide for position and orientation calculation of both the tool 203 and the marker 215 from a single image.

The position and orientation of the camera 230 and the optical frame of reference may be defined prior to the deployment of the surgical robot 200. A combination of the camera mounts 225 and a pre-operation calibration may allow a frame of reference to be defined, with little expectation of drift or movement during surgery. If the camera 230 is securely mounted to the surgical robot 200 and the camera 230 is not removed between surgeries, full calibration may only be needed before a first use. However, a test may be performed before each surgery to confirm the camera accuracy, using predefined reference points. If the camera is moved between surgeries or there are changes to the camera mount 225, such as, for example, flexing or temperature changes, small changes to the frame of reference may occur. Full calibration may be performed on the camera 230 using, for example, standard computer vision calibration techniques. This may include calibrating the intrinsic lens parameters to remove lens distortion and calibrating extrinsic camera positions relative to a fixed position, such as the base 211 of the surgical robot 200.

Figure 4:
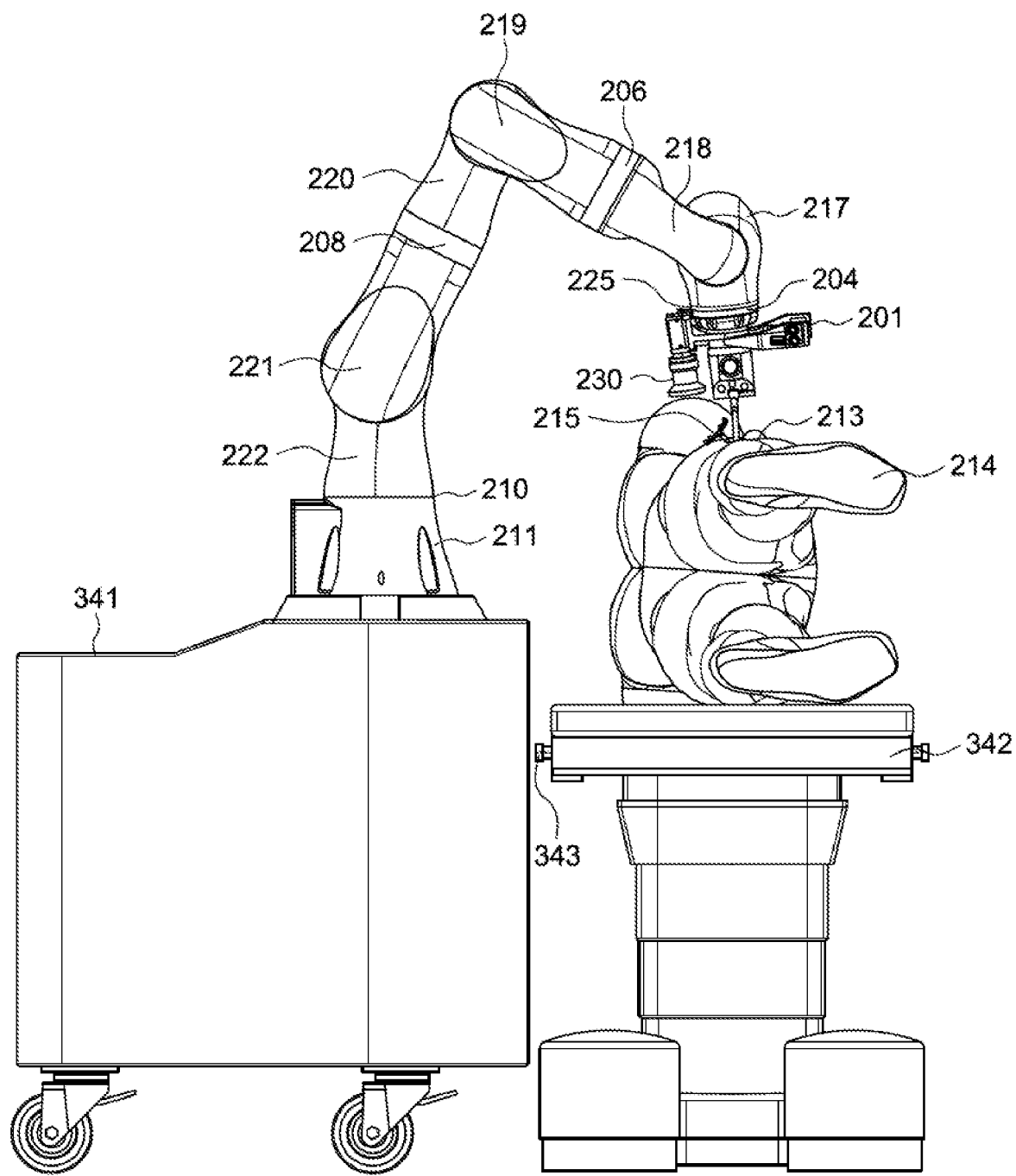
FIG. 4 is a side elevational view of the surgical robot and the patient of FIG. 1, with the surgical robot disposed on a cart adjacent to the patient positioned on a surgical table, according to an embodiment of the present disclosure.
Figure 5:
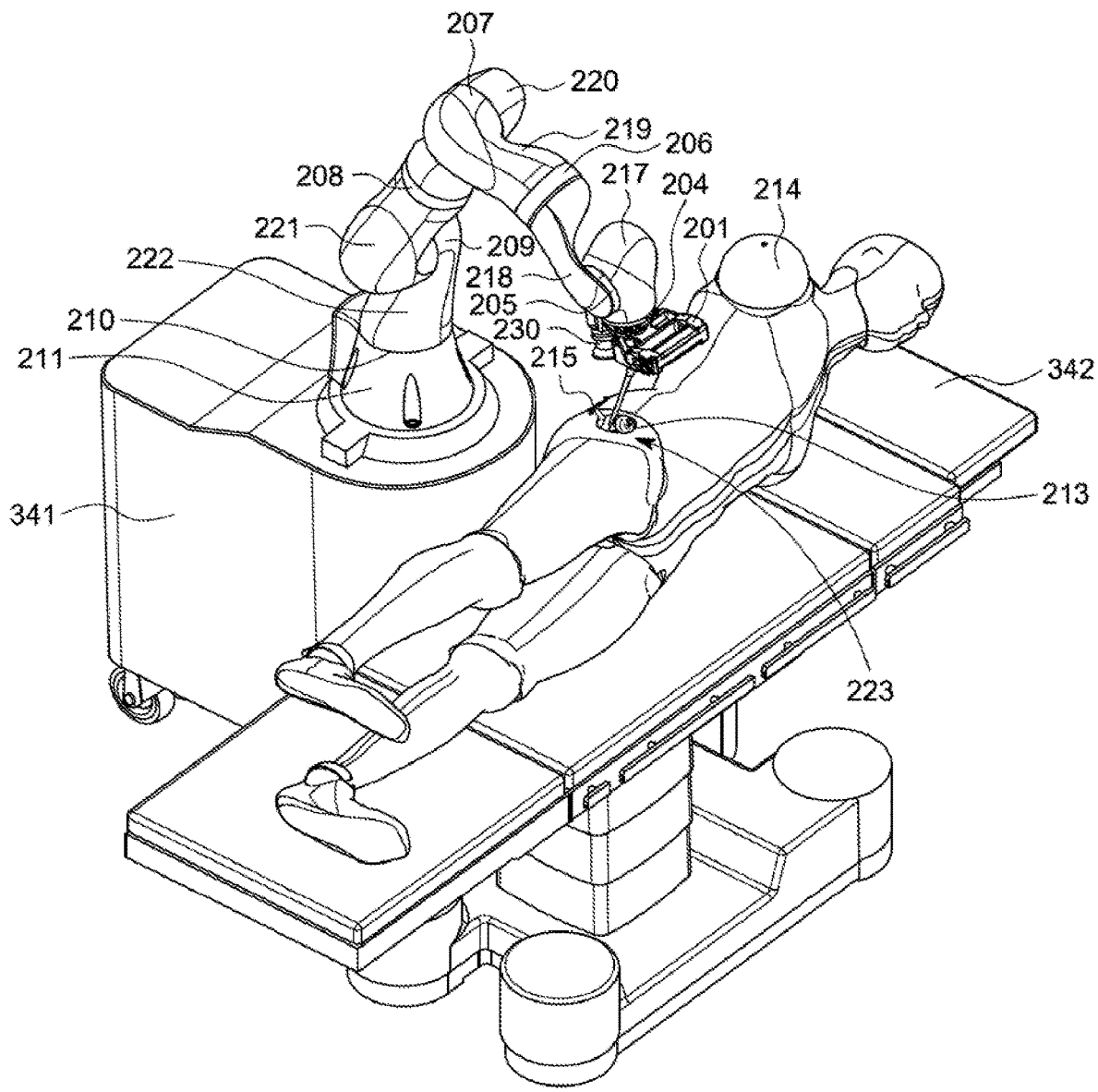
FIG. 5 is an inferior perspective view of the surgical robot and the patient of FIG. 1, according to an embodiment of the present disclosure.
Figure 6:
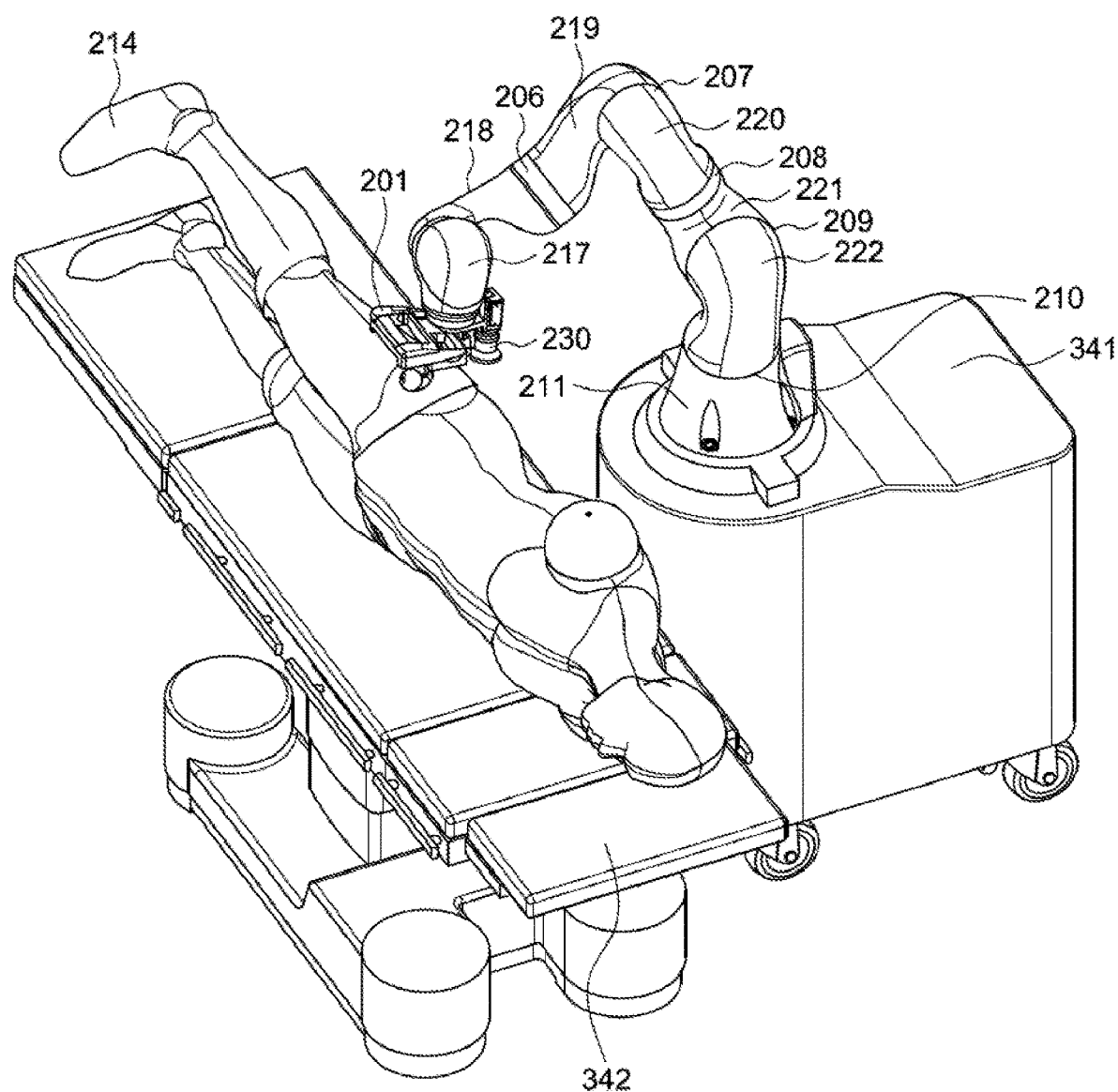
FIG. 6 is a superior perspective view of the surgical robot and the patient of FIG. 1 according to an embodiment of the present disclosure.

FIGS. 4-6 show the surgical robot 200 mounted to a cart 341, with the cart 341 possibly connected to a surgical table 342 with a cart connector 343. The surgical robot 200, the cart 341, and the surgical table 342 are shown in relation to the patient 214. The surgical robot 200 is shown mounted to the cart 341 at the base 211. Connecting the surgical cart 341 via a cart connector 343 to the surgical table 342, may create a fixed physical connection such that positions and orientations of identified objects on the surgical table 342 may be calculated in relation to the fixed frame of reference of the surgical robot 200, or of the base 211. The fixed frame of reference of the surgical robot 200, being measured from the base 211, may remain fixed for all other frames of reference for the duration that the cart 341 is connected to the surgical table 342.

Figure 7:
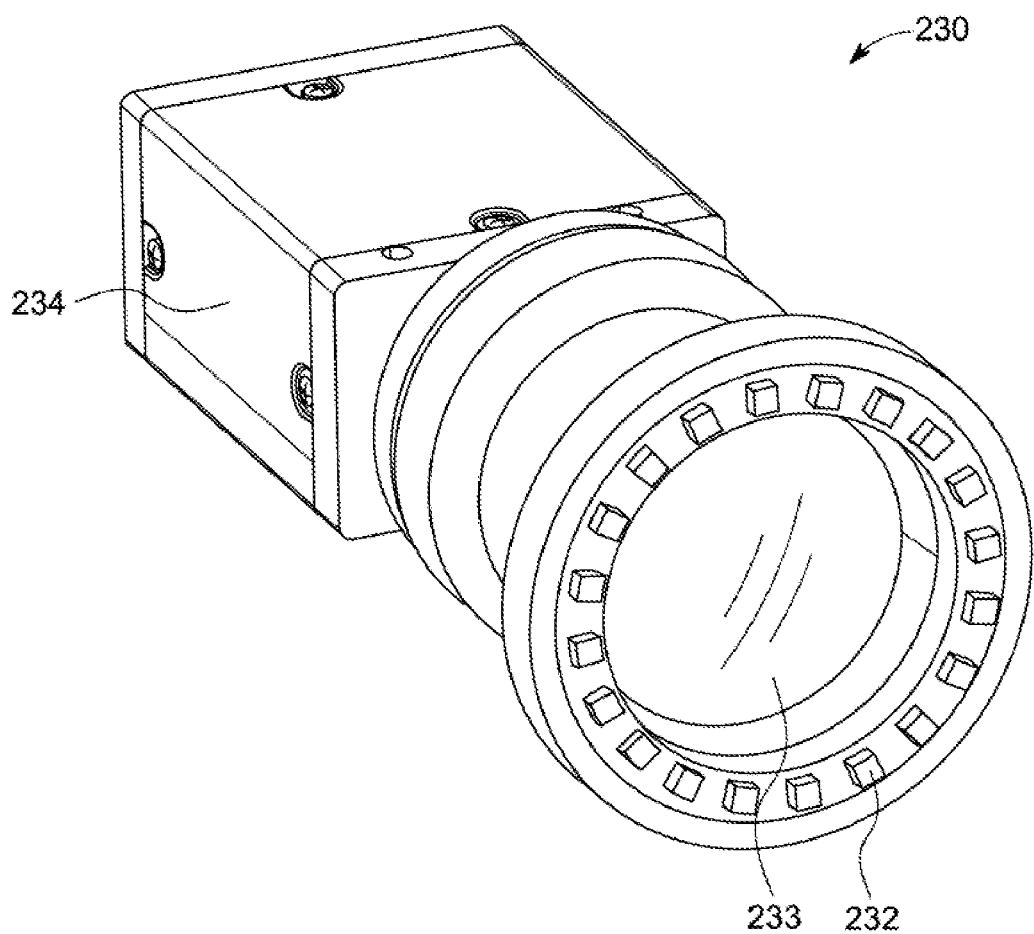
FIG. 7 is an enlarged, perspective view of the camera of the robotic system of FIG. 1, according to an embodiment of the present disclosure.

Referring to FIG. 7, the camera 230 may include a camera body 234, an LED array 232, and a lens 233. The LED array 232 may be positioned around lens 233, in a circular shape. However, the LED array 232 may be in any shape. The LED array 232 may transmit infra-red light and/or visible light, and the camera 230 may be sensitive to infra-red light reflected from the marker 215 (FIG. 21) or a movable reflective object. A second set of LED lights or a spotlight may be provided, transmitting visible light to identify the field of view. The camera 230, may have, for example, a one cubic meter space field of view. The second set of LED lights or the spotlight may automatically turn on when the surgical robot 200 is actively being positioned but may be turned off through controls or automatically by the robotic system 10. An array of laser light projectors may be used instead of, or in addition to the visible lights. The laser light projectors may project a visible ring indicating the edge of the field of view of the camera 230. The LED array 232 may be disposed on and attached to the camera 230 or disposed on an arm mounted camera 235.

Figure 21:
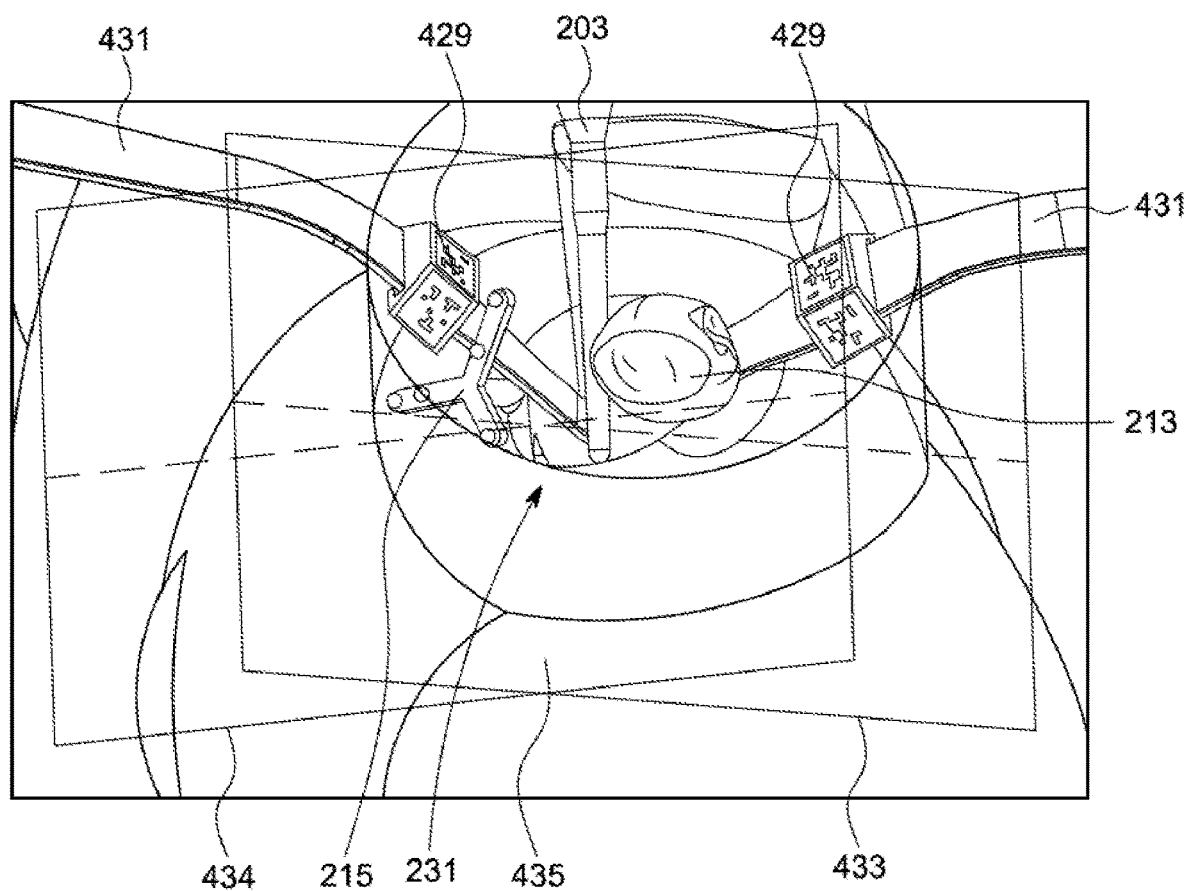
FIG. 21 is a perspective view of the field of view of the stereo camera of FIG. 19, according to an embodiment of the present disclosure.

While the camera 230 of FIG. 7 is described as being sensitive to infra-red light, a visible light camera may be used with other visual markers such as AprilTags 429 (FIG. 21) or similar fiducial markers, rather than reflective markers. The LED array 232 may instead be a visible light array when used with a visible light camera enabled to read the AprilTags 429 (FIG. 21).

With reference again to FIG. 2, the emitted visible light field may match the field of view of the camera 230. Objects within the visible light field may be visible to the camera 230 (or cameras). The camera 230 may, for example, gather information such as position and orientation data of the surgical robot 200 and the camera angle in relation to the object, allowing the surgical robot 200 to better adjust the position of the joints and the body parts of the surgical robot 200 to complete the cut along the prescribed path. A second lighting system identifying the field of view of the camera 230 may be necessary due to a relatively small view field, close proximity to a patient, and potentially moving field of view due the movable position of the camera 230, mounted on, for example, the flange 204.

The expression "work envelope" may encompass the three-dimensional space within reach of the surgical robot 200. The work envelope may also be narrowed to the space surrounding the surgical site 223 encompassing the incision and the positional marker 215. The field of view and the work envelope may, at times, be the same.

Figure 8:
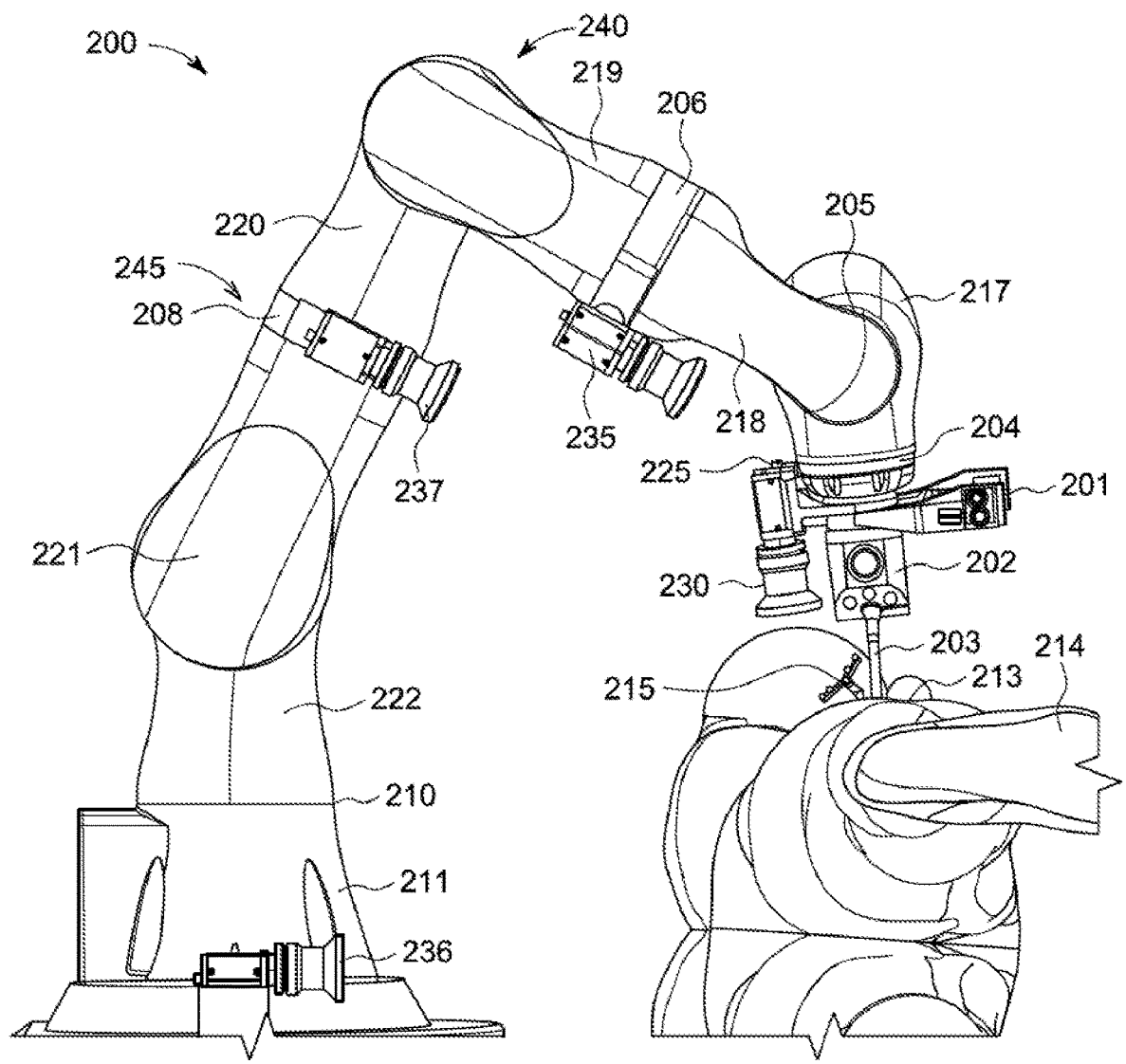
FIG. 8 is an enlarged, side elevational view of the surgical robotic system of FIG. 1 with additional cameras, according to an embodiment of the present disclosure.

As shown in FIG. 8, the surgical robot 200 may have one or more cameras, with the cameras disposed or attached, for example, on the joints 245, the base 211, or flange 204 of the surgical robot 200, according to the present disclosure. In this illustrated embodiment, the surgical robot system 10 may include a plurality or multiplicity of cameras. For example, the camera 230 may be operably mounted on the camera mount 225, the flange 204, the control handle 201, and the end effector 202. The surgical robot 200 may also have, for example, a first arm mounted camera 235 and a second arm mounted camera 237 mounted on the second joint 206 and the fourth joint 208, respectively. A base mounted camera 236, may be operably mounted to the base 211 of the surgical robot 200. The marker 215 may be connected to the patient 214. The first arm mounted camera 235 and second arm mounted camera 237, may be used to provide tracking assistance during the surgical procedure. The second joint 206 may represent a wrist of the surgical robot and the fourth joint 208 may represent an elbow of the surgical robot. The camera 236 at the base 211 of the surgical robot 200 may remain fixed as the base of the surgical robot remains fixed. The first arm mounted camera 235 may generally move as the second joint 206 moves and the second arm mounted camera 237 may generally move as the fourth joint 208 moves. While the surgical robot 200 may have up to seven degrees of freedom, there may be a limit to the degrees of freedom that the cameras may move. For example, the camera affixed to an intermediate joint (e.g., the first arm mounted camera 235, mounted on the second joint 206) may have less degrees of freedom than one affixed to the flange 204 (e.g., the camera 230). Furthermore, motion control algorithms may be used to use the kinematic redundancy of the surgical robot 200 to minimize the movement of the camera 230 relative to the target. For example, the motion control algorithms may be used to provide instructions to keep the camera frame centered on the target by adjusting the position of a joint while executing a surgical cut. The position and orientation of the first arm mounted camera 235 and the second arm mounted camera 237 may be adjusted during the cutting process through the movement of the second joint 206 and the fourth joint 208 respectively, while the tool 203 remains in a fixed position.

Figure 9:
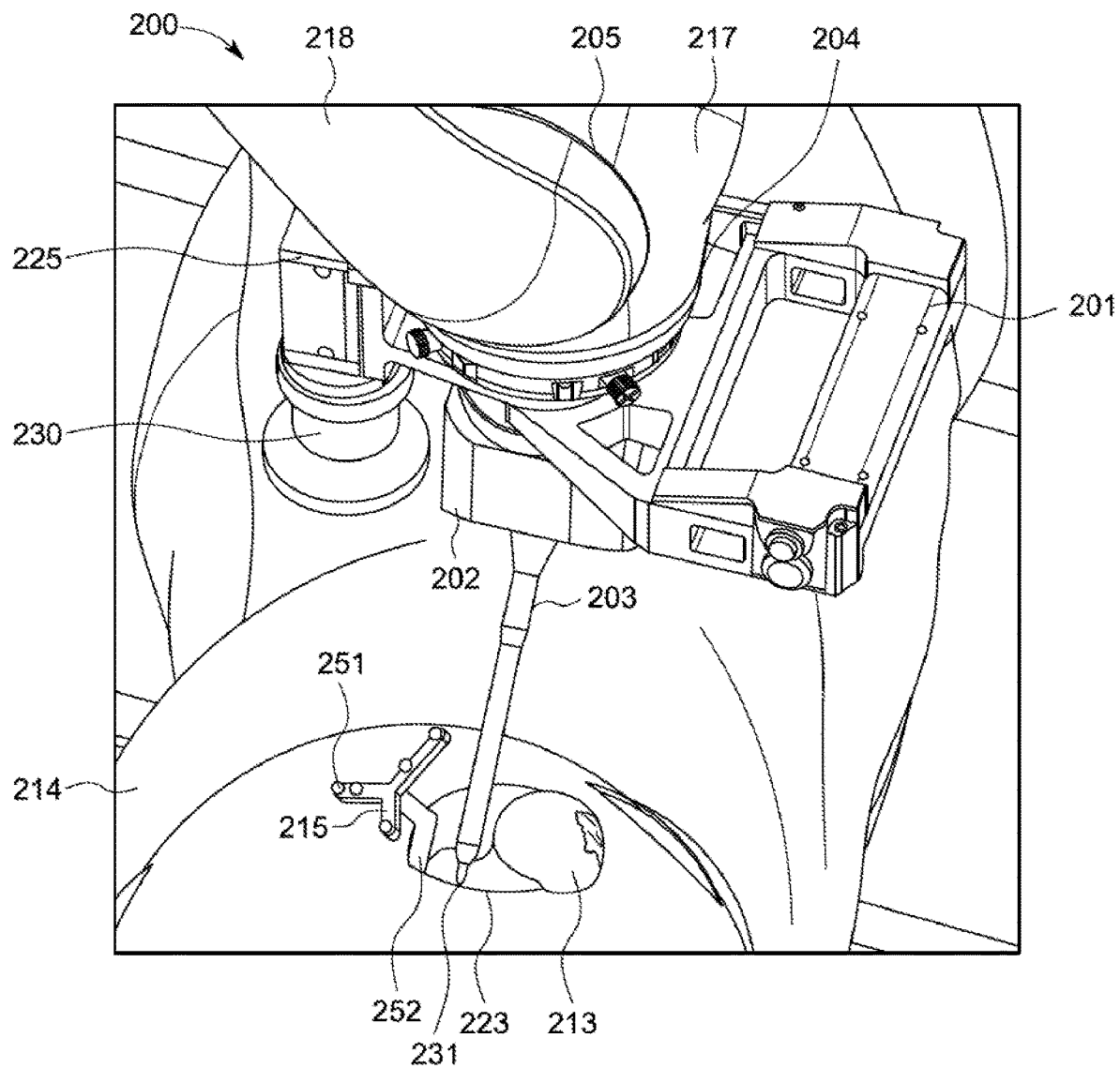
FIG. 9 is an enlarged, top perspective view of the flange and end effector of the surgical robot and of the surgical site of FIG. 1, according to an embodiment of the present disclosure.

FIG. 9 illustrates the camera 230 mounted, with camera mount 225, mounted to the flange 204, and connected to the control handle 201, and the end effector 202. The tool 203 is connected to the end effector 202, with the tool tip 231 within the surgical site 223 of the patient 214. The marker 215 is disposed within the surgical site 223 in relationship to the tool 203 and the femur 213. The positional marker 215 may have a plurality of ball markers 251 and a stem 252.

Figure 10:
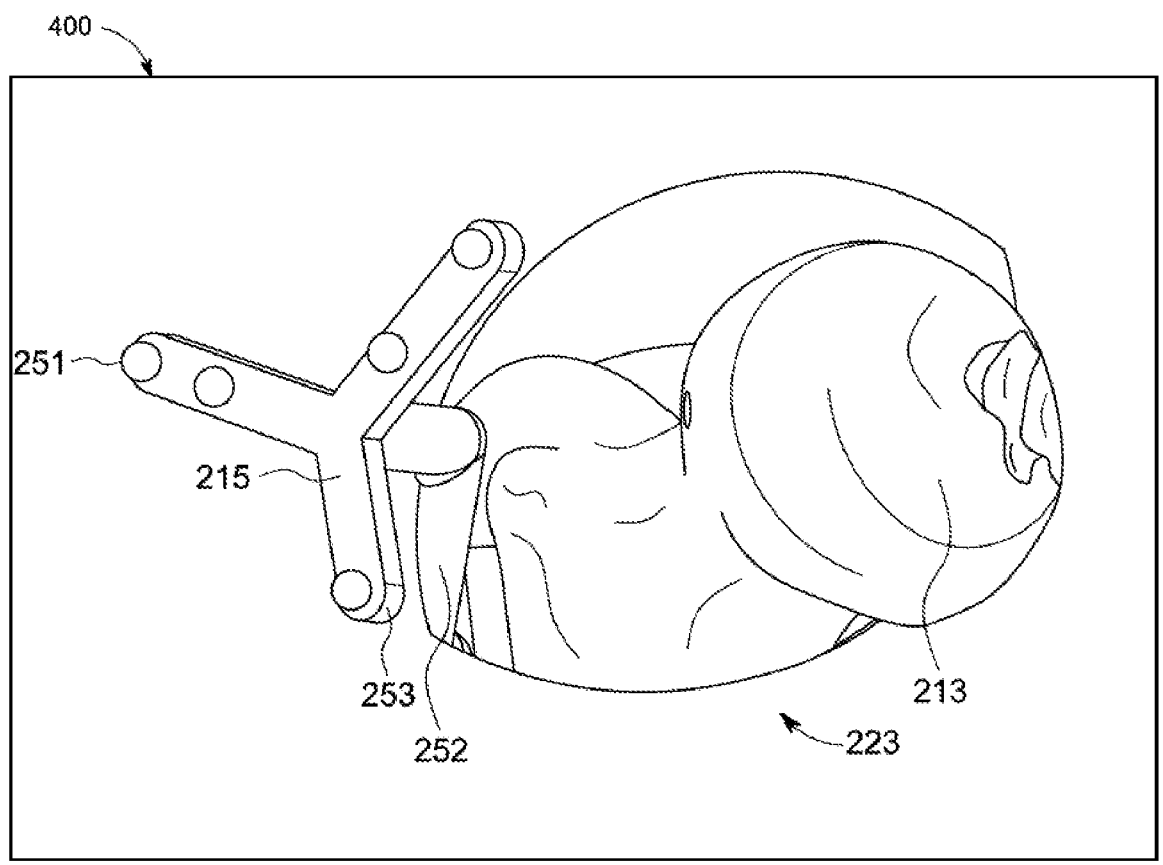
FIG. 10 is a video display illustrating the surgical site of FIG. 9, according to an embodiment of the present disclosure.

As shown in FIG. 10, a video display 400 illustrates representations of the surgical site, according to an embodiment of the present disclosure. The positional marker 215 may be positioned within the surgical site 223 and in close proximity to the femur 213. The positional marker 215 may have ball markers 251 and the stem 252. In place of the ball markers 251, other fiducial markers may be used, such as AprilTags 429 (FIG. 21).

FIGS. 9 and 10 illustrate the marker 215 with an equidistant tri-arm structure with several reflective ball markers 251 positioned about the marker arms 253. A tri-arm structure is positioned outside the surgical site 223 on the stem 252 that is attached to the target bone or a nearby bone. Each tracked object will have a different and unique relationship of distances between each of the ball markers 251 at the origin. The origin is understood to be the position and/or orientation of the object in relation to the ball markers 251 at the time the object is registered as described in greater detail below. The object may be a position or an item. The object may further be identified by determining the object's position and/or orientation relative to all the ball markers 251, with, for example, five ball markers 251 being positioned on the marker 215 with the tri-arm structure. Over time, the position and/or orientation of the object relative to the ball markers 251 may change, and the position and/or orientation may need to be determined and tracked over that time period. In an alternative embodiment, AprilTags 429 (FIG. 21) may be used instead of ball markers 251. The stem 252 is offset to allow the camera 230 (FIG. 9) mounted on the flange 204 (FIG. 9) so that the camera's field of view is operable to observe both the ball markers 251 and the surgical site 223. The offset stem 252 has the tri-arm structure on one end, while the other end may be anchored to a target bone using a surgical screw.

As shown in FIG. 9, having the camera 230 mounted to the flange 204 places the position of the camera 230 close or adjacent to the surgical site 223, which results in the marker 215 being small enough to be mounted close or adjacent to or within the surgical site 223. This configuration provides the marker 215, the surgical site 223, and the tool tip 231 within the field view of the camera 230, allowing the surgical robot 200 to track positional changes of objects within the surgical site 223 during the surgical operation.

Figure 11:
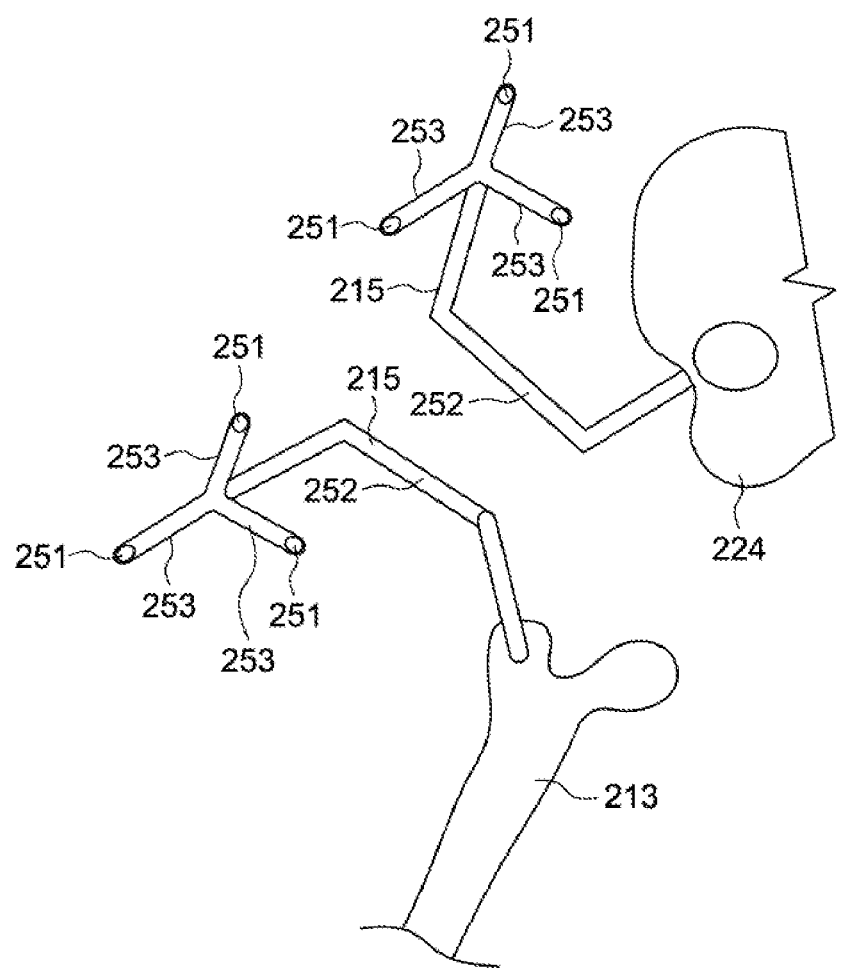
FIG. 11 is a perspective view of two markers connected to the patient's femur and pelvis bones, according to an embodiment of the present disclosure.

As shown in FIG. 11, in another embodiment, two markers (e.g., markers 215) may be operably connected to two bones, with a first connected to the femur 213 and a second connected to a pelvis 224. The markers 215 may be connected to the bones using surgical screws. The markers 215 may include an elongated and angled stem 252, with each of the markers 215 having three arms 253, (i.e., tri-arm structure) and ball markers 251 connected to each of the arms 253. The markers 215 may be made of a non-reactive metal or plastic. The markers 215 may be of a height so that the markers 215 may be connected to the femur 213 or the pelvis 224, and still have the tri-arm structure protrude from the surgical incision. The stems 252 may be approximately 100 millimeters (mm) to 300 mm in linear length along the elongated stem 252, from a bone connection to the arms 253. The stem angle may be, for example, approximately 120 degrees to 150 degrees. The stem may be cylindrical with a diameter of, for example, about 6 mm to about 18 mm. However, the stem need not be cylindrical and may be of any elongated cross-sectional shape. Each arm 253 may be approximately 12 mm to 50 mm in length. The ball markers may be from approximately 3 mm to 12 mm in diameter, however the size and cross-sectional shape may vary if different markers, such as AprilTags 429 (FIG. 21) are employed.

Figure 12:
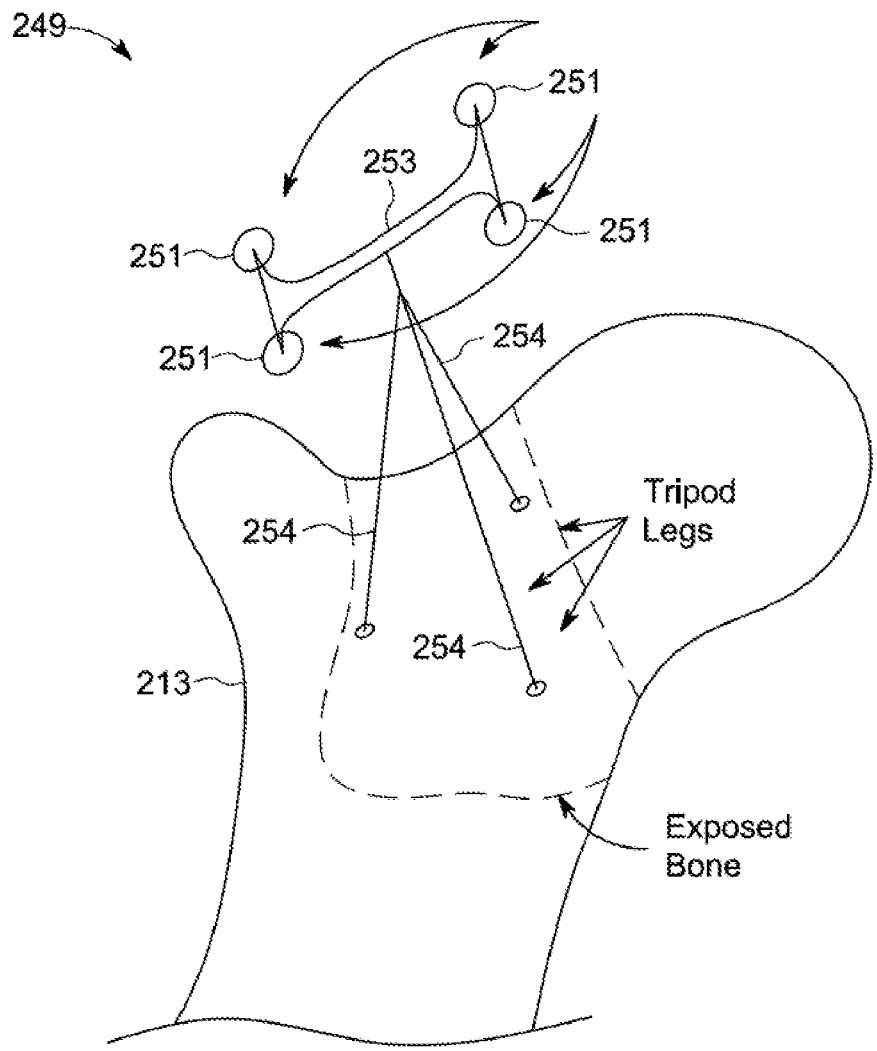
FIG. 12 is a perspective view of a tripod stylus secured to a patient's femur, according to an embodiment of the present disclosure.

Referring to FIG. 12, a tripod stylus 249 may include a tripod stem 254 placed onto the femur 213, a monolithic arm 253 with four corners, and ball markers 251 on each corner. The tripod stylus 249 may be used with a discreet imaging system to triple the number of points collected with each image. The tripod stylus 249 may be moved, in the direction of the curved arrows, to different positions on the femur 213 after each image is taken and the points of the tripod in contact with the femur 213 are collected during registration.

Figure 13:
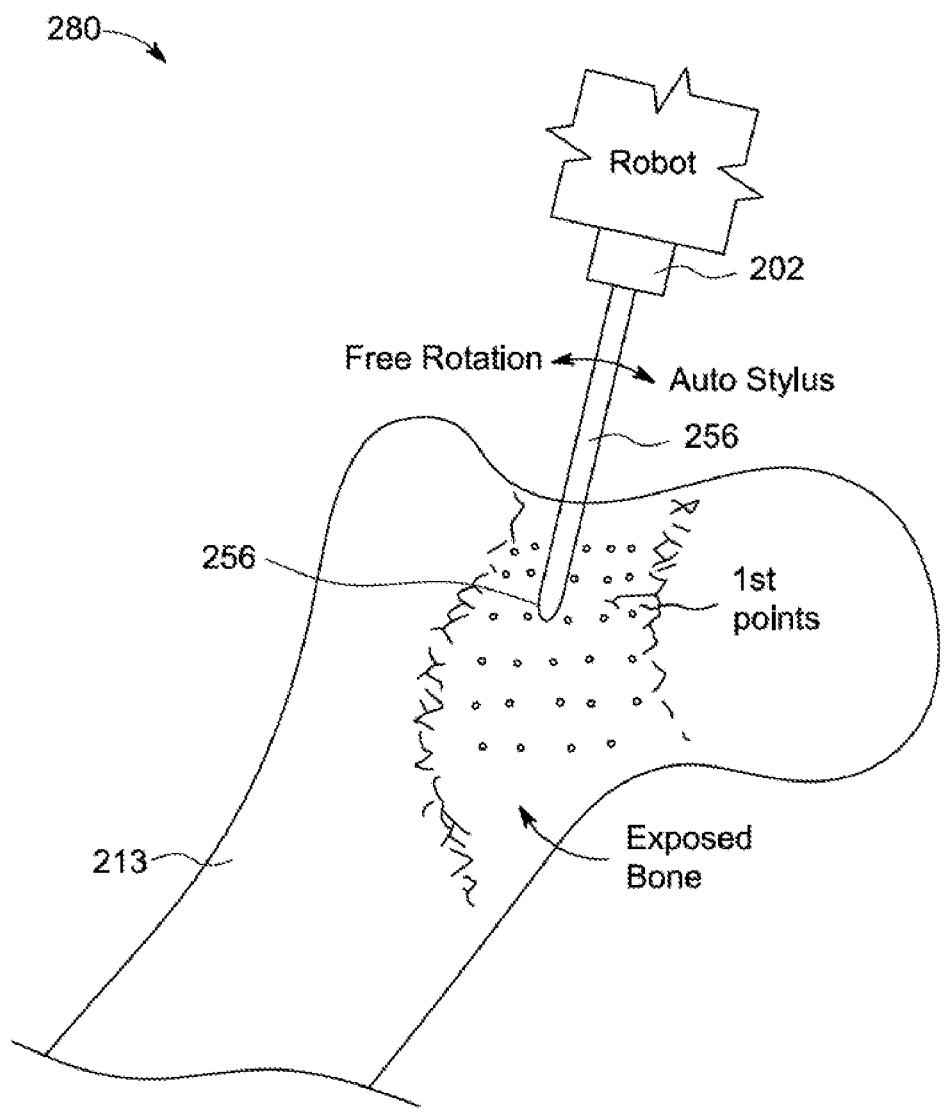
FIG. 13 is a perspective view an auto-stylus end effector and a patient's femur, according to an embodiment of the present disclosure.
Figure 14:
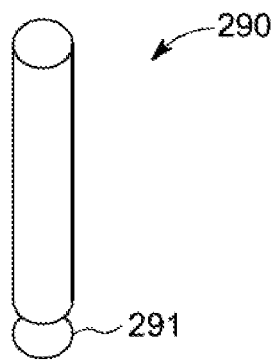
FIG. 14 is a perspective view of an auto-stylus having a roller tip, according to an embodiment of the present disclosure.
Figure 15:
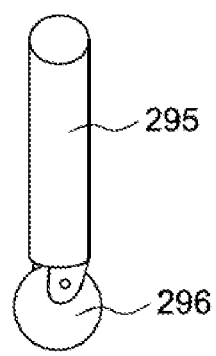
FIG. 15 is a perspective view of an auto-stylus having a ball tip, according to an embodiment of the present disclosure.

FIGS. 13-15 illustrate three embodiments of an auto-stylus in accordance with the present disclosure. With reference to FIG. 13, an auto-stylus 255 may be controlled by the surgical robot 200 and connected to the end effector 202. The auto-stylus 255 may eliminate the need for a marker 251 (FIG. 1) because the auto-stylus 255 may be an extension of the surgical robot 200. In other embodiments, an auto-stylus may be an auto-stylus 290 (FIG. 14) with a ball point 291 (FIG. 14). or an auto-stylus 295 (FIG. 15) with a roller tip 296, which allows movement along the bone providing for continuous imaging rather than just individual or discreet points.

With reference still to FIG. 13, the auto-stylus 255 may be used to define positions relative to the marker 215 (FIG. 1) on the bone 215 or within the surgical site 223. With the robot 200 having the auto-stylus 255, the marker 215 (FIG. 1) may be in the field of view of the camera 230 (FIG. 9). In conjunction with a grid, which may be projected onto the bone surface or just observed by the surgeon on a visual display, the surgical robot 200 may move in slow predefined steps to points on the target bone that correspond to points on the grid. The auto-stylus 255 may have a pressure sensitive tip that may register contact with the target bone. The tripod stylus 249 (FIG. 12) may also be used with the surgical robot 200 as an auto-stylus 255, with the tripod legs 254 having pressure sensitive tips. The tripod stylus 249 may be lifted by the surgical robot 200 and placed in a new position for recording. With a tripod stylus 249, discreet imaging may be used.

Figure 16:
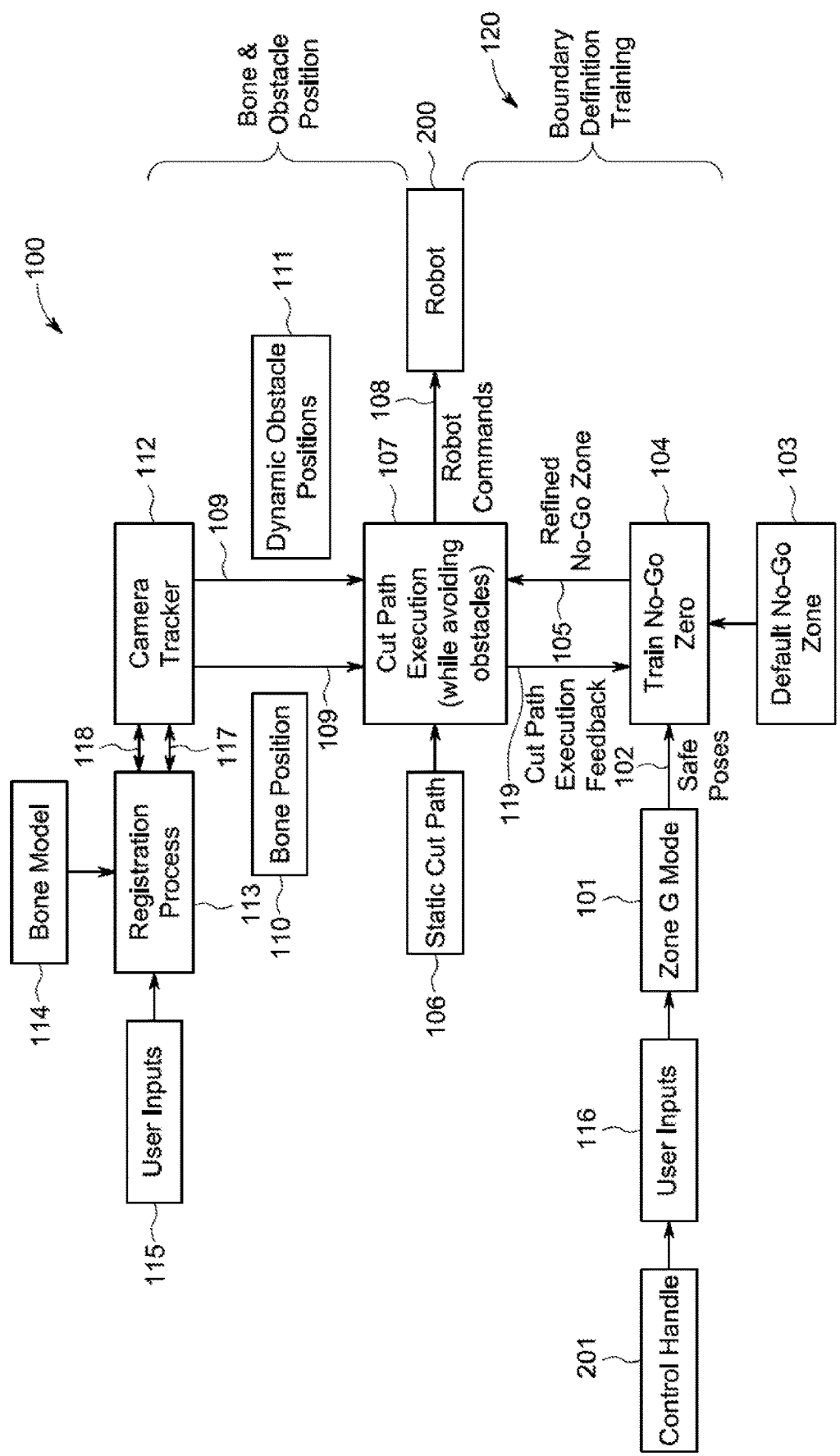
FIG. 16 is a block diagram of a surgical method employing a surgical robotic system having a camera system, according to an embodiment of the present disclosure.

FIG. 16 illustrates a block diagram of a method for creating cut path execution commands and sending cut path execution commands to the surgical robot 200. In describing the method of FIG. 16, reference may be made to corresponding components of the surgical robotic system 10 (FIG. 1). FIG. 16 is divided into upper and lower blocks, with the upper and lower blocks providing input to a cut path execution block 107 and the surgical robot 200. The inputs to the cut path execution block 107 may collectively be known as surgical plan data. The upper blocks concern the definition of a bone, such as the femur 213 (FIG. 1), and obstacle positions. A lower portion refers to boundary constraint definitions. The upper blocks describe a method to determine the position of the surgical robot 200 relative to the surgical site 223 (FIG. 1), or work envelope, and to map the surgical site 223 (FIG. 1) by determining the bone position and the dynamic position of obstacles. The actual surgical site 223 (FIG. 1) of the surgical robot 200 may be smaller than the work envelope.

The control handle 201 may be used to control the surgical robot 200 by changing functional modes, for example, placing the surgical robot 200 into a move mode or placing the robot into a cut mode. The move mode may be used prior to performing a surgical cut to instruct the surgical robot 200 by providing, for example, boundaries, and identifying objects (e.g., positions on the femur 213 (FIG. 1)). A cut mode may be initiated to perform a surgical cut or series of cuts. The steps referenced in the method for creating the cut path execution commands and sending the cut path execution commands to the surgical robot 200 may be used to train the surgical robot 200 by performing a registration process 113, prior to initiating the cut mode and performing a surgical cut or cuts.

The registration process 113 may include, for example, using a bone model 114 to define an initial bone position, and receiving user inputs 115 to define actual bone positions in relation to a frame of reference and updating the bone model 114. The actual bone positions and orientation may, for example, be defined in relation to the marker 215 (FIG. 1), i.e., the frame of reference. The bone model 114 may be a calculated surface area of a bone calculated via, for example, a computerized tomography scan segmentation. The points for matching may be selected prior to creating an incision and a surgical procedure is created, specifying where on a viewable bone points may be collected for registration. Once the matching points are surgically exposed, sides, under hangs, or hard to reach areas may be ignored. The registration process is generally a two-step process of initially matching landmarks on the bone and then collecting many surface points to refine the registration. The landmarks picked are generally in places that can be reached with a standard incision. The user inputs and registration process may be data on, for example, various markers, e.g., the marker 215 (FIG. 2) near the bone, and points on the bone in relation to the marker 215 (FIG. 2), so that a point cloud is created. The point cloud provides data on landmarks for the surgical robot 200, which may be used to confirm actual positions of points on the bone surface in relation to the bone model 114. Registration is referred to as the act of identifying positions on the bone, e.g., the femur 213 (FIG. 1) or other objects for the surgical robot 200, such that the surgical robot 200 may be able to identify the positions during the surgical procedure and make adjustments.

With reference again to FIG. 1, during registration, the marker 215 and the surgical site 223 may be in view of the camera 230 mounted on the flange 204. A bone, for example, the femur 213, within the surgical site 223 may be visible to the camera 230. The camera 230 mounted on the flange 204 may, for example, project infrared light into the field of view of the camera 230. The stylus (e.g., tripod stylus 249 FIG. 12)) or another marking device (e.g., the autostylus 255 (FIG. 13) may be used to identify various points on the bone being operated on. Infrared light reflects off the marker 215 from, for example, the ball markers 251 (FIG. 9), and the reflected light is collected by the camera 230 and used by the surgical robot system 200 to identify relative positions and orientations between the markers 251 (FIG. 9) and the identified object. AprilTags and visible light may be used in place of the ball markers 251 (FIG. 9) and infrared light.

With reference again to FIG. 16, the registration process 113 may further include, for example, a processing circuit performing a transform chaining operation to transform positions defined on the femur 213 (FIG. 1) relative to the marker 215 (FIG. 2), to positions on the femur 213 (FIG. 1) relative to a frame of reference defined by the base 211 (FIG. 1), (e.g., world frame of reference). Position data of the surgical robot 200 and the relative position of objects or locations may be stored or updated in a database or a storage medium.

The registration process 113 may further provide registration process data 117 (e.g., updated bone model data) to a camera tracker 112. The camera tracker 112 may further update the bone model 114 by, for example, transforming the frame of reference of the bone model 114 to a frame of reference relative to the surgical robot 200 (e.g., world frame) and further sending camera tracker data 118 to the registration process 113 for further bone model refinement. The camera tracker data 118 may include, for example, the position of the marker 215 (FIG. 2) relative to the base 211 (FIG. 1), and the relative positions on the femur 213 (FIG. 1) or may include just the positions on the femur 213 (FIG. 1) relative to the marker 215 (FIG. 2), with just the marker location being determined. The camera tracker data 118 may include input from the camera tracker 112 and, for example, updates to the bone model 114 using the updated bone model data 117 and the previous camera tracker data 118. The exchange of the camera tracker data 118 and the registration process data 117 between the registration process 113 and the camera tracker 112, may provide a final bone model 109 by, for example, registering user inputs 115 of actual bone position on the bone model 114 in relation to a frame of reference relative to the surgical robot 200 (e.g., world frame). The final bone model 109 may include, for example, the bone position 110 and the obstacle position 111 being sent to the cut path execution processing block 107. The camera tracker 112 may wait for the registration process 113 to complete before sending the final bone model 109 to the cut path execution processing block 107, or the final bone model 109 may dynamically update the cut path execution processing block 107.

Figure 17:
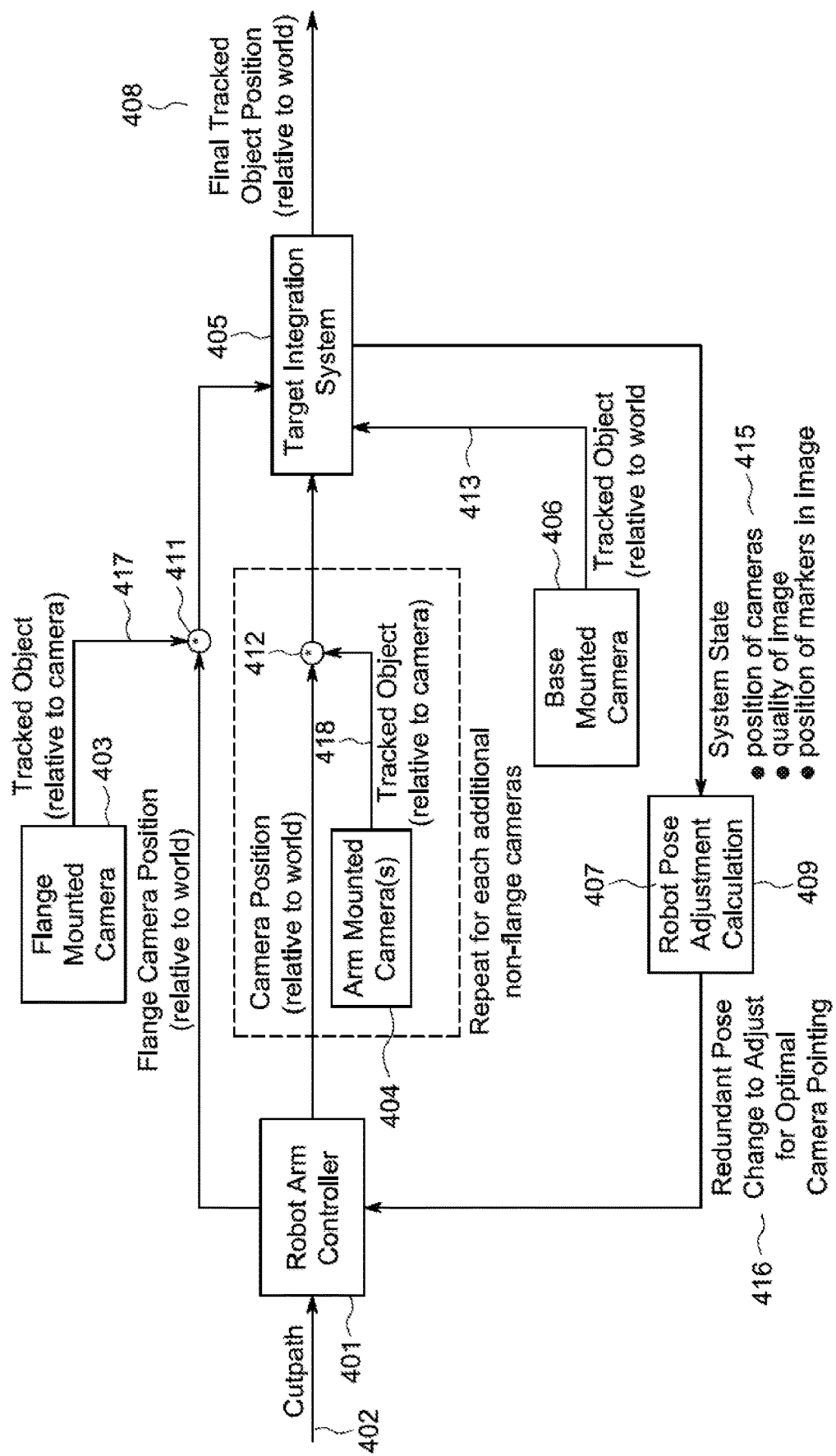
FIG. 17 is a block diagram of a method of interacting with a robotic system having a camera system, according to an embodiment of the present disclosure.

FIG. 17 illustrates a block diagram of a method of using the camera system. A robot arm controller block 401 is provided with cut path data 402. The cut path data 402 may correspond to a sequence of physical way points on the tracked target over which the tool tip 231 (FIG. 1), (e.g., a burr, passes in sequence). The surgical robot 200 (FIG. 1) may require where these way points are in physical space (e.g., relative to the world frame) so that the surgical robot 200 (FIG. 1) may move the tool tip 231 FIG. 1) over those way points to perform the surgical cut. The way points along the cut path may be tracked based on output from the camera 230 (FIG. 1) or the arm mounted camera 235 (FIG. 8). This may be a continuous process performed during the surgical robot's execution of the cut path. The robot arm controller 401 may be a processing circuit which, for example, receives data inputs for processing based on computer code and sends output signals for adjusting and controlling surgical robot 200 (FIG. 1). Physical camera position and orientations of the camera 230 (FIG. 1) and the arm mounted camera 235 (FIG. 8) are defined relative to the surgical robot's world frame. The world frame may be, for example, attached to and determined from the base 211 (FIG. 1) of the surgical robot 200 (FIG. 1). A flange mounted camera block 403 provides tracked first object data 417 to the first conjunction 411. The flange mounted camera block 403 represents, for example, the camera 230 (FIG. 1) mounted on the flange 204 (FIG. 1) gathering image and position and orientation data about a first object. The first object may be, for example, the position and/or orientation of a physical object defined during the registration process, or an object that is within the view of the camera 230 (FIG. 1) and definable by the surgical robot system (FIG. 1). The first object data 417 may include, for example, first object image data and first object position and orientation data relative to a physical the camera 230 (FIG. 1) mounted on the flange 204 (FIG. 1). The robot arm controller block 401 may send the position and orientation data of the camera 230 (FIG. 1) relative to the world frame to a first conjunction 411. The first conjunction 411 may perform a transform chaining operation to determine the first object position and orientation relative to the world frame. This process may be continuous, for example, with the transform chaining operation calculation rate being approximately the same as the frame rate of camera 230 (FIG. 1). The first object image data and first object position and orientation data relative to the world frame may be provided to a target integration system block 405.

The transform chaining operation may be performed using the following calculation:

$$(^{W}_{A}T *^{A}_{B}T =^{W}_{B}T)$$

In the calculation, the first transform represents an object "A" relative to a world frame "W." The second transform represents an object "B" relative to the object "A" frame. The resulting transform is for the object "B" relative to the world frame "W."

The workflow chart of FIG. 17 further illustrates an arm mounted camera block 404 representing the arm mounted camera 235 (FIG. 8) mounted on a body part or joint of the surgical robot 200 (FIG. 1), capturing images and deriving position and orientation data from a second object. For example, as shown in FIG. 8, there may be more than one arm mounted camera where the first camera 235 is mounted on the second joint 206 and the second camera 237 is mounted on the fourth joint 208, which first and second arm mounted camera having fields of view illustrating arm positions for the camera 230 mounted on the flange 204.

With reference again to FIG. 17, the second object position and orientation may be determined relative to the position and orientation of the arm mounted camera 235 (FIG. 8) as second object data 418. The arm mounted camera block 404 provides second object data 418 to a second conjunction 412. The robot arm controller block 401 provides the position and orientation data of the arm mounted camera 235 (FIG. 8) relative to the world frame to the second conjunction 412. The second conjunction 412 uses the transform chaining operation to determine the position and orientation of the second object relative to the world frame. This process may be continuously performed at the second conjunction 412 with the, for example, transform chaining operation calculation rate being approximately the same as the frame rate of the camera 230 (FIG. 8). The second object image data and second object position and orientation data relative to the world frame may be provided to target integration system block 405.

FIG. 17 also illustrates a base mounted camera block 406, representing the base mounted camera 236 (FIG. 8) gathering third object data 419, which may include image data and position and orientation data. The base mounted camera 236 (FIG. 8) is shown already mounted to the base 211, and position information may be relative to the world frame. The base camera mount block 406 transmits third object data 419 to the target integration system 405. Since the base mounted camera 236 (FIG. 8) is operably located at the base 211 (FIG. 8) of the surgical robot 200 (FIG. 8), the third object data may be directly calculated relative to the base 211 (FIG. 8). Using the base mounted camera 236 (FIG. 8), for example, to track the other cameras may improve the position and orientation accuracy. Accuracy may also be improved by, for example, comparing the position and orientation data returned by the base mounted camera 236 (FIG. 8) to that determined by the surgical robot 200.

From the present description, it will be appreciated by one skilled in the art that additional cameras may be present to provide more accurate images and position and orientation data. With the surgical robot 200 (FIG. 8) having multiple cameras, some cameras may be, for example, tracking the object being cut, e.g., the femur 213 (FIG. 1), from different frames of reference, the robotic surgical system 10 (FIG. 1) may employ those images relative to the world frame to create a more accurate picture and data processing. Other cameras (e.g., base mounted camera 236 (FIG. 8)) may be to track, for example, the camera 230 (FIG. 1), and/or the first arm mounted camera 235 (FIG. 8), and/or the second arm mounted camera 237 (FIG. 8). Additional cameras may be operably affixed or mounted to the arm or links or joints of the surgical robot 200 (FIG. 1), in addition to the cameras represented by the flange mounted camera block 403, the arm mounted camera block 404 and the base mounted camera block 406. The objects represented in the workflow of FIG. 17 may be, for example, the femur 213 (FIG. 1), another camera, the marker 215 (FIG. 1), the stylus (e.g., tripod stylus FIG. 12)), or the auto-stylus 255 (FIG. 13).

The flange mounted camera block 403 of FIG. 17 may signify data gathered by the camera 230 (FIG. 1) which may gather first object data 417. The arm mounted camera block 404 may also gather second object data 418, where, for example, the second object and the first object may be the same object viewed from different relative positions. The arm mounted camera 235 (FIG. 8) and/or the base mounted camera 236 (FIG. 8) may or may not have a view of the first object and the second object within view may be camera 230 (FIG. 8). However, the arm mounted camera block 404 may also represent data gathered on other objects, where, for example, the first object and second object are different. The second object position and orientation data may include, for example, the position and orientation of the camera 230 (FIG. 8) on the flange 204 (FIG. 8), other cameras, other joints, other links, or other markers within the field of view of the arm mounted camera 235 (FIG. 8).

The target integration system block 405 of FIG. 17 may represent a device or processor circuit that, for example, receives data from the various blocks providing output in the form of a final tracked object position data 408. The target integration system block 405 may, for example, combine the position and orientation data from various objects as input and may transmit output of the final tracked object data 408 and the system state data 415. The final tracked object data 408 may include, for example, updated bone position and orientation data 110 (FIG. 16) relative to the world frame, dynamic obstacle data 111 (FIG. 16), and a final bone model 109 (FIG. 16). The system state data 415 may, for example, include data on the position and orientation of the camera 230 (FIG. 8) and/or the arm mounted camera 235 (FIG. 8), quality of the image, and the position and orientation of the marker 215 (FIG. 2).

Referring still to FIG. 17, the workflow may be controlled by multiple processor circuits with, for example, tracking being controlled by one processor circuit (e.g., the target integration system 405) and motion being controlled by a second processor circuit (e.g., the robot arm controller 401). Additional processing circuits may be present, for example, at the first conjunction 411 and/or the second conjunction 412.

A surgical robot poses adjustment calculation block 409 may receive system state data 415, process the data, and then transmit a redundant pose change information to adjust for an improved camera position 416. The robot arm controller block 401 may receive the redundant pose change information to adjust for improved camera position 416 and may also provide adjustments for the camera position relative to the world frame for all cameras.

It is further contemplated that a multi-camera system viewing the marker 215 (FIG. 8), may gather data from the camera 230 (FIG. 8) and the arm mounted camera 235 (FIG. 8), and send data for correlation and combination within the target integration system block 405. The system state data 415 may include, for example, the camera positions relative to the marker 215 (FIG. 8), an object's position relative to the marker 215 (FIG. 8), and the cameras' relative position relative to the object. The surgical robot poses adjustment calculation block 409 may use, for example, triangulation to adjust and refine the robot joint position and thus the cameras' positions.

With further reference still to the workflow of FIG. 17, the steps of the method of using the camera system may be performed statically, for example, during the registration and the camera tracking steps of FIG. 16. The steps provided in FIG. 17 may also be performed dynamically while the surgical robot 200 (FIG. 1) is performing a surgical cut. To track the bone location, the marker 215 (FIG. 2) is identified by the camera 230 (FIG. 1) and relative positions are identified on the bone 213 (FIG. 1) using the stylus (e.g., the tripod stylus 249 (FIG. 12) or the auto-stylus 255 (FIG. 13) to define a bone surface during the registration process of FIG. 16. In this way, the surgical robot 200 (FIG. 1) tracks the bone position and changes in position and/or orientation during surgery. During surgery, retractors may be used to move soft tissue out of the trajectory of the cutting tool 231 (FIG. 1) and to provide clear access to bone. With accurate views and marking, changes to soft tissue position or other obstacles may be automatically updated to the surgical robot system 10 to adapt to such modifications.

With reference again to FIG. 1, during the surgical cut, registered positions may have been stored relative to the marker 215 and surface of the femur 213 (i.e., the bone) may be defined for the surgical robotic system 10. The surgical robotic system 10 performs the surgical cut according to the cut path 402 (FIG. 17). As the surgical robot 200 moves along the cut path, the camera 230 (or cameras) views both the cut and the marker 215. The tracked object, for example, the marker 215, is viewed and the cut path positions are determined relative to the marker 215, which may then be determined by the conjunction 411 (FIG. 17), and/or conjunction 412 (FIG. 17), relative to the world frame. The target integration system block 405 (FIG. 17) may continue to provide the tracked object position 408 (FIG. 17) after integrating the object or objects relative to camera positions and orientations. The target integration system block 405 (FIG. 17) may also provide system state information 415 (FIG. 1) based on the position of the camera, image quality, and the marker 215 position and orientation, to the robot pose adjustment block 409 (FIG. 17), which adjust the robot and improved camera position 416 (FIG. 17) to complete the cut path 402 (FIG. 17). The process of determining camera positions, robot position, feedback and adjustment may be a continuous process based on streaming images from the camera 230 for the duration of the surgical cut. To maintain continuous updates, the marker 215 may need to remain in full view during the entire cutting procedure, as the marker 215 may be used to provide feedback on the bone positions and orientations. If a view is obstructed or tracking is lost, the surgical robotic system 10 pauses cutting and motion until the marker tracking is resumed and a resume signal is sent by the surgeon. The use of multiple cameras, such as, for example, the camera 230, the first arm mounted camera 235 (FIG. 8), the second arm mounted camera 237 (FIG. 8), and/or the base mounted camera 236 (FIG. 8), may allow the surgical robotic system 10 to determine the position of the camera 230 and to continue cutting, even if the marker 215 is not visible by the camera 230. A second marker (not shown) may be placed near the base 211 and such that the second marker is viewable within the field of view of the camera 236 positioned at the base 211, for use in dynamic calibration during the movement of the surgical robot 200.

Figure 18:
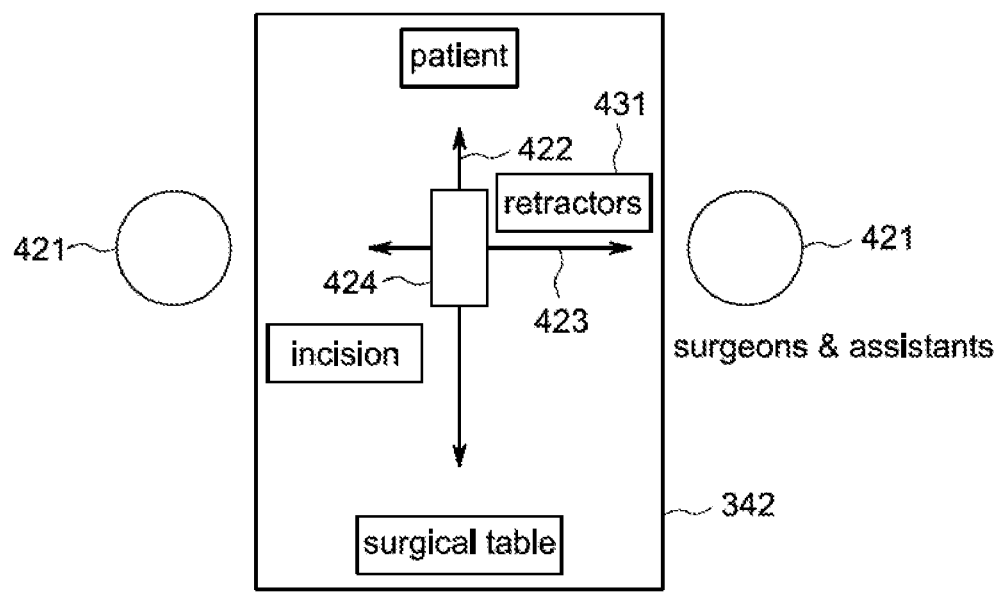
FIG. 18 is a diagrammatic illustration of position orientation, according to an embodiment of the present disclosure.

FIG. 18 illustrates an orientation diagram to aid in describing the camera positioning in relation to objects on the surgical table 342. A longitudinal axis 422 may indicate the orientation of the patient on the surgical table 342. A second perpendicularly-disposed axis 423 may indicate the direction in which one or more retractors 431 may be used to pull apart an incision. An incision orientation marker 424 may indicate an approximation of the orientation of the incision. The incision orientation marker 424 may be an approximation of the cut in the direction of the longitudinal axis 422 widened through the use of the retractors 431 along the perpendicularly-disposed axis 423. Surgical team members 421 may be disposed on sides of the surgical table 342 and the incision orientation marker 424.

Figure 19:
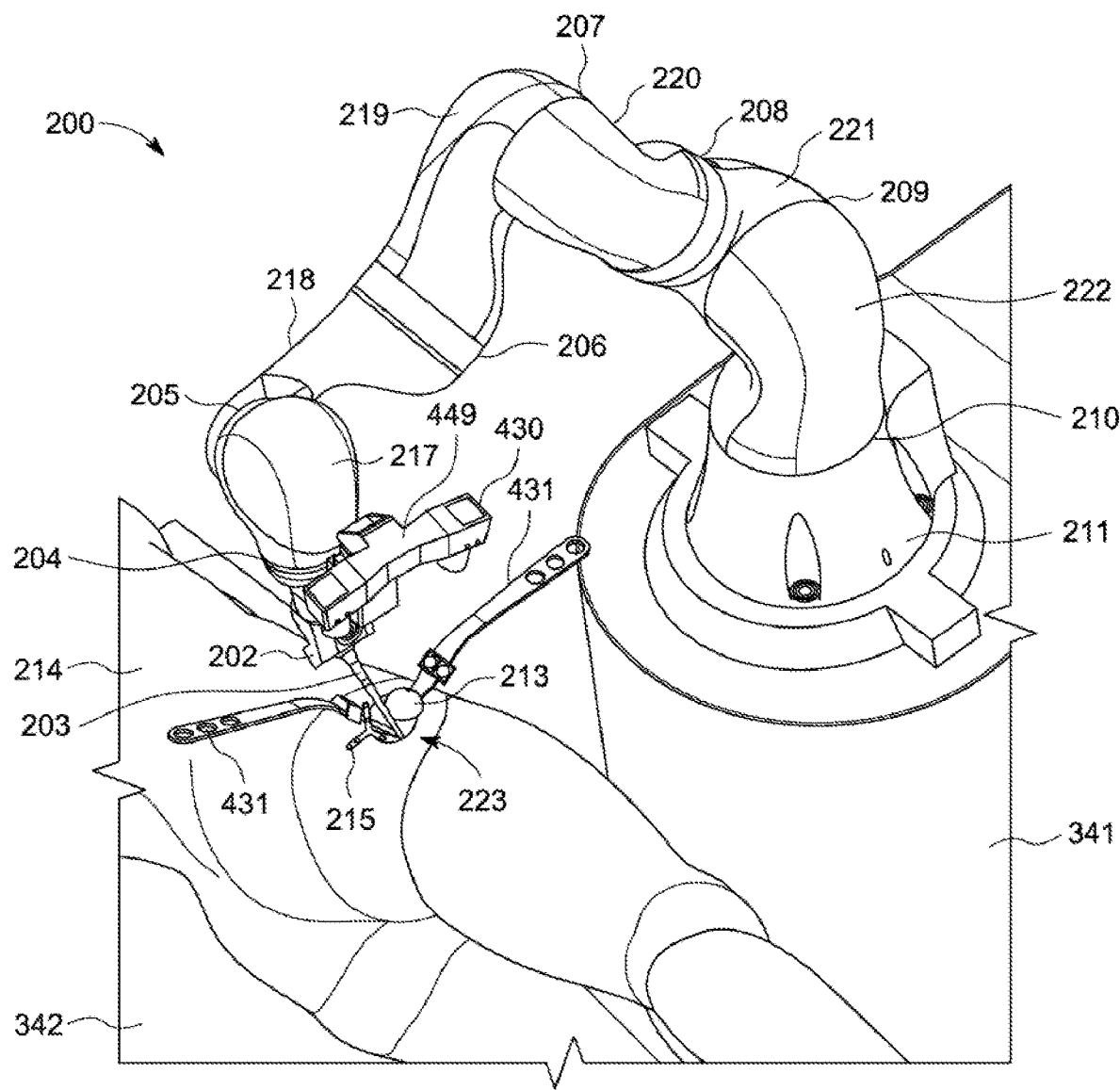
FIG. 19 is a perspective inferior view of the surgical robotic system and patient with a stereo camera system, according to an embodiment of the present disclosure.

FIG. 19 illustrates the surgical robot 200 with a stereo camera 430 mounted to the flange 204. The retractors 431 may be disposed within the surgical site 223. The stereo camera 430 may be positioned on the flange 204, which is also the most proximate member of the surgical robot 200 to the incision.

As shown in FIG. 19, the stereo camera 430 may be affixed to the surgical robot 200 on the flange 204, with the stereo camera 430 positioned along the perpendicularly-disposed axis 423 (FIG. 18) and opposite the first joint 205, which is also the active joint or moving joint. Such positioning may, for example, minimize interference with the surgical team members 421 (FIG. 18) and maintain mobility of surgical robot 200 by minimizing interference with the joints or members of the surgical robot 200. The stereo camera 430 may be mounted, for example, on the side of the flange 204 opposite the end effector 202 mounting, because the motor and housing (i.e., actuating member) may obstruct the line of site of the stereo camera 430.

Figure 20:
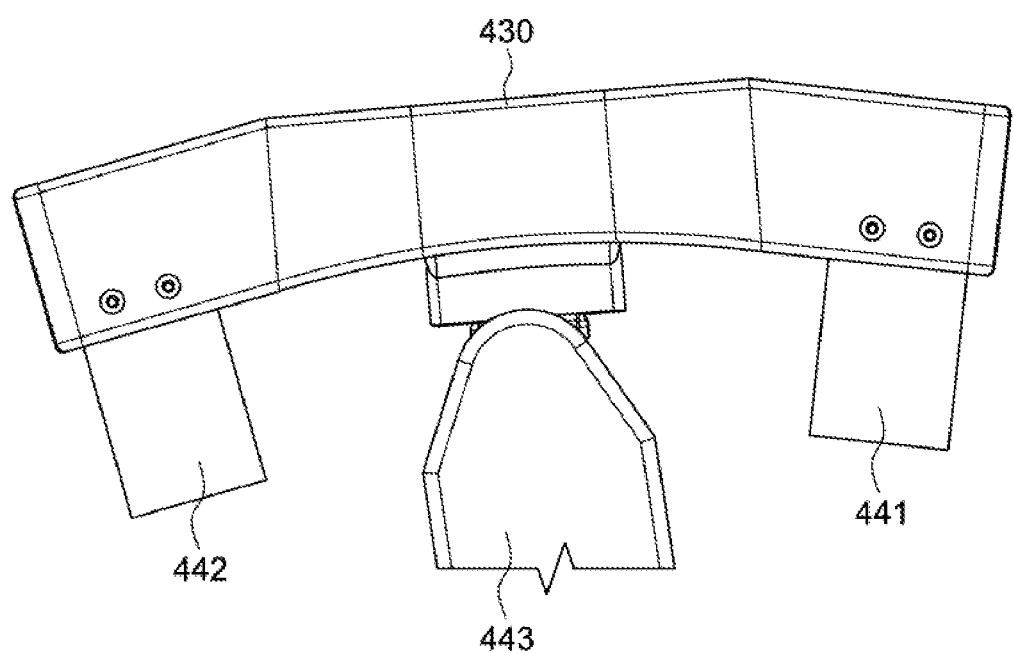
FIG. 20 is a side elevational view of the stereo camera system of FIG. 19, according to an embodiment of the present disclosure.
Figure 22:
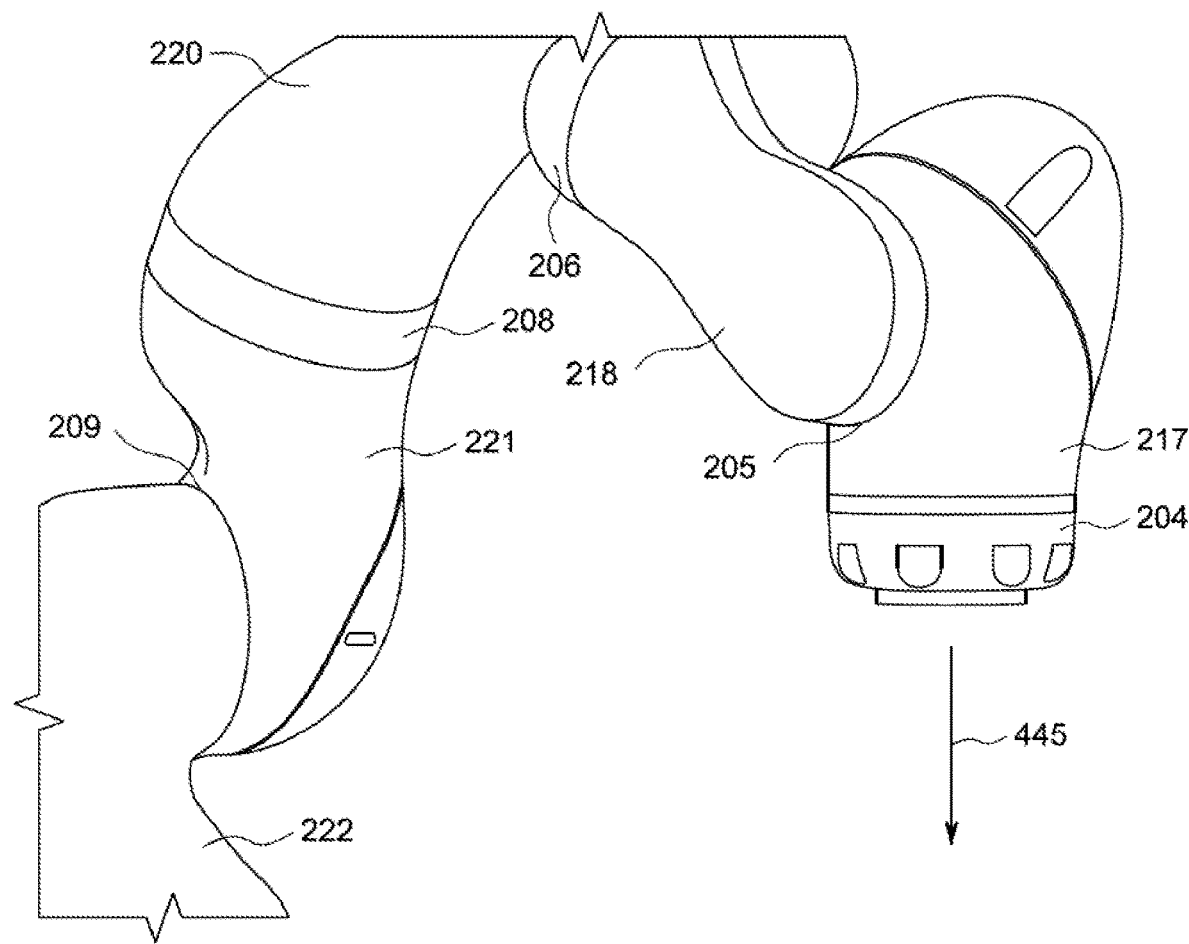
FIG. 22 is a perspective view of the surgical robot of FIG. 1, in relation to a common center, according to an embodiment of the present disclosure.

Referring to FIG. 20, the stereo camera 430 may include a camera support 443, a first camera 441, and a second camera 442. The first camera 441 may have a first camera field of view 433 (FIG. 21). The second camera 442 may have a second camera field of view 434 (FIG. 21). The first camera field of view 433 (FIG. 21) and the second camera field of view 434 (FIG. 21) may be represented by rectangular shapes. The rectangular shape is for illustration purposes and the actual fields of view of the cameras are not meant to be limited to any particular shape. The first camera 441 and the second camera 442 may be biased such that, for example, the first camera field of view 433 (FIG. 21) is centered on a first camera point of interest and the second camera field of view 434 (FIG. 21) is centered on a second camera point of interest. The first camera 441 and the second camera 442 may be biased such that, for example, an overlapped field of view 435 (FIG. 21) of the first camera field of view 433 (FIG. 21) and the second camera field of view 434 (FIG. 21) may be centered on a point of interest. The point of interest may be, for example, the tool tip 231 (FIG. 21) or a common axis 445 (FIG. 22), i.e., the intersection of an axis centered through the flange 204 (FIG. 22) or the first body part 217 (FIG. 1). Additionally, the marker 215 (FIG. 2) and the AprilTags 429 (FIG. 21) may be used to adjust registration or positioning.

As shown in FIG. 21, the surgical objects, such as retractors 431 or other surgical tools, tend to either extend in the direction of the perpendicularly-disposed axis 423 (FIG. 18) or tend to be within reach of the surgical team members 421 (FIG. 18), with surgical team members 421 (FIG. 18) positioned in the vicinity of the perpendicularly-disposed axis 423 (FIG. 18). Thus, from a surgical exposure perspective, it may be preferable to maximize the field of view in the direction of the perpendicularly-disposed axis 423 (FIG. 18) in relation to the surgical table 342 (FIG. 18) so that surgical objects may remain in the field of view of the stereo camera 430 (FIG. 20) during the surgical procedure. To maximize the field of view for surgical procedures it may be useful to, for example, bias the first camera 441 (FIG. 20) and the second camera 442 (FIG. 20) such that the field of view centers for each camera are centered beyond the point of interest, rather than directly on the point of interest.

Figure 23:
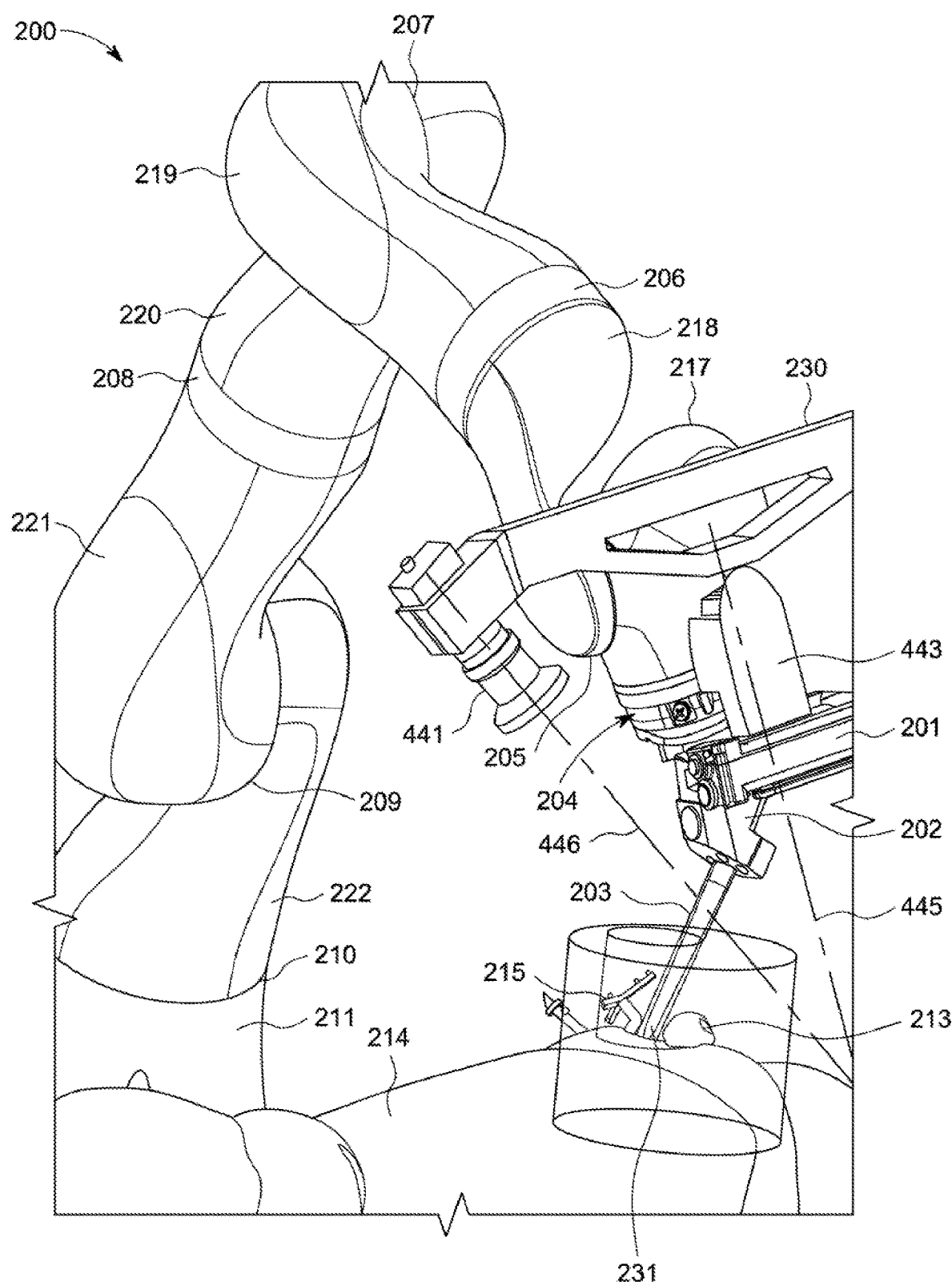
FIG. 23 is a perspective view of a surgical robotic system and camera system, indicating a biased angle field of view, according to an embodiment of the present disclosure.
Figure 24:
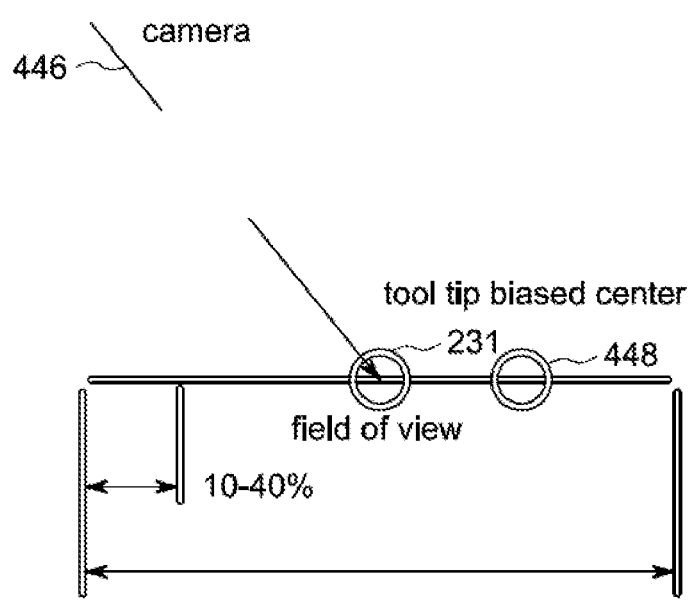
FIG. 24 is a diagrammatic illustration of a biased field of view, according to an embodiment of the present disclosure.

With reference to FIGS. 23 and 24, it may be useful to bias the first camera 441 (FIG. 23) and the second camera 442 (FIG. 20) such that their respective fields of view are centered beyond the point of interest. For example, the surgical robot 200 (FIG. 23) may have the first camera 441 (FIG. 23) biased such that a first camera field of view center 446 is disposed beyond the common axis 445 and tip 231 of the tool 203. By biasing the field of view, and thus shifting the center of the field of view, the total field of view of both cameras 441 (FIG. 23) and 442 (FIG. 20) may be maximized by increasing the overlapped field of view 435 (FIG. 21) of the first camera field of view 433 (FIG. 21) and second camera field of view 434 (FIG. 21) and extending the respective fields of view along the perpendicularly-extending axis 423 (FIG. 18). An optimized shift of the center of the field of view of one camera may be, for example, about 10 percent to about 40 percent in the direction towards the other camera. Shifting the entire first camera field of view 433 (FIG. 21) by, for example, about 10 percent to about 40 percent towards second camera 442 (FIG. 20) shifts the first camera field of view center 446 from, for example, a tool tip position 231 to a biased center 448 (FIG. 24) in the direction of the perpendicularly-extending axis 423 (FIG. 18) toward the second camera 442 (FIG. 20). Shifting the entire second camera field of view 434 (FIG. 18) by, for example, about 10 percent to about 40 percent towards first camera 441 (FIG. 23) shifts the second camera field of view center from, for example, the tool tip position 231 to a biased center in the direction of the perpendicularly-extending axis 423 (FIG. 18) toward the first camera 441 (FIG. 23).

Figure 25:
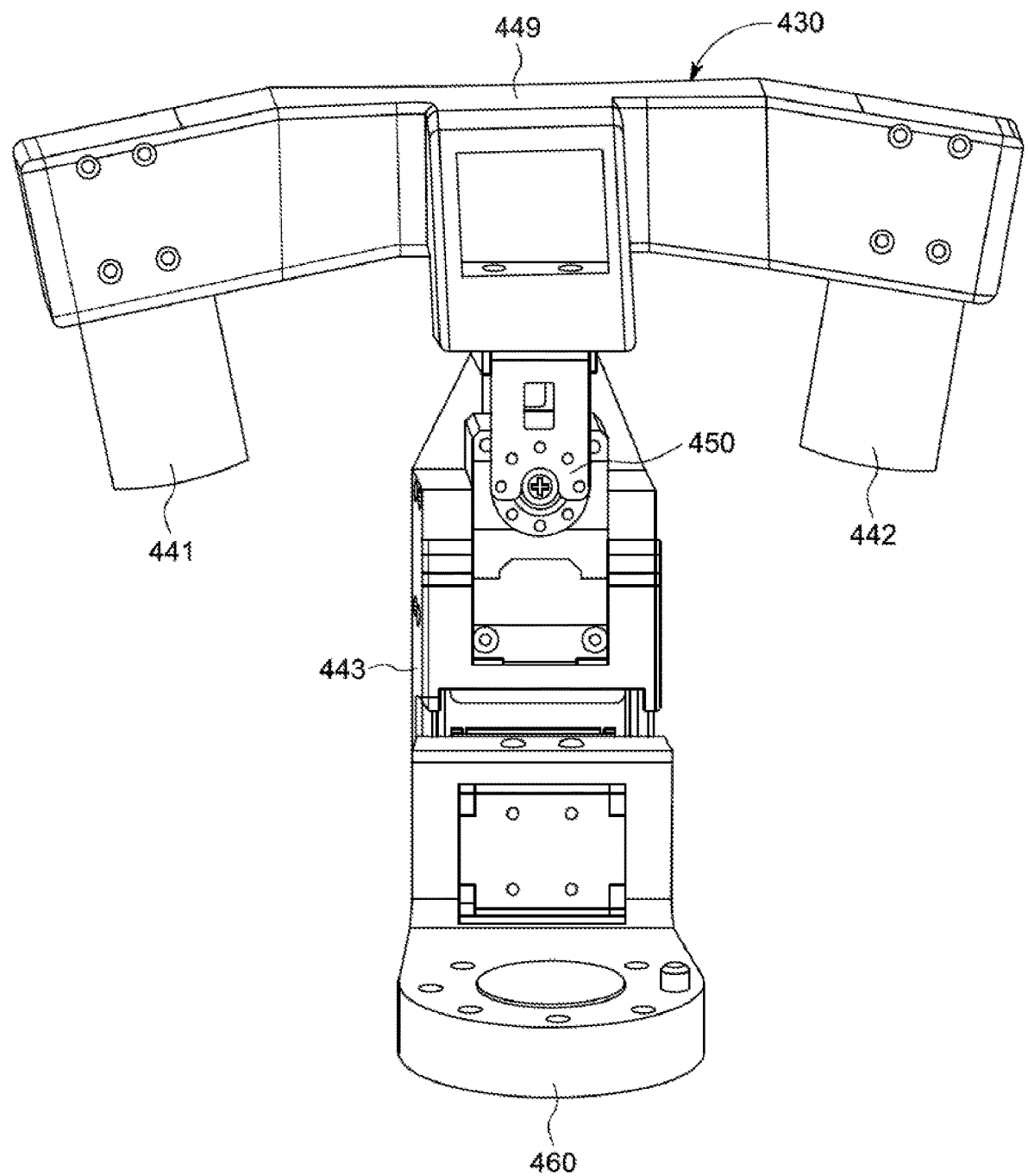
FIG. 25 is a perspective view of a stereo camera system, according to an embodiment of the present disclosure.
Figure 26:
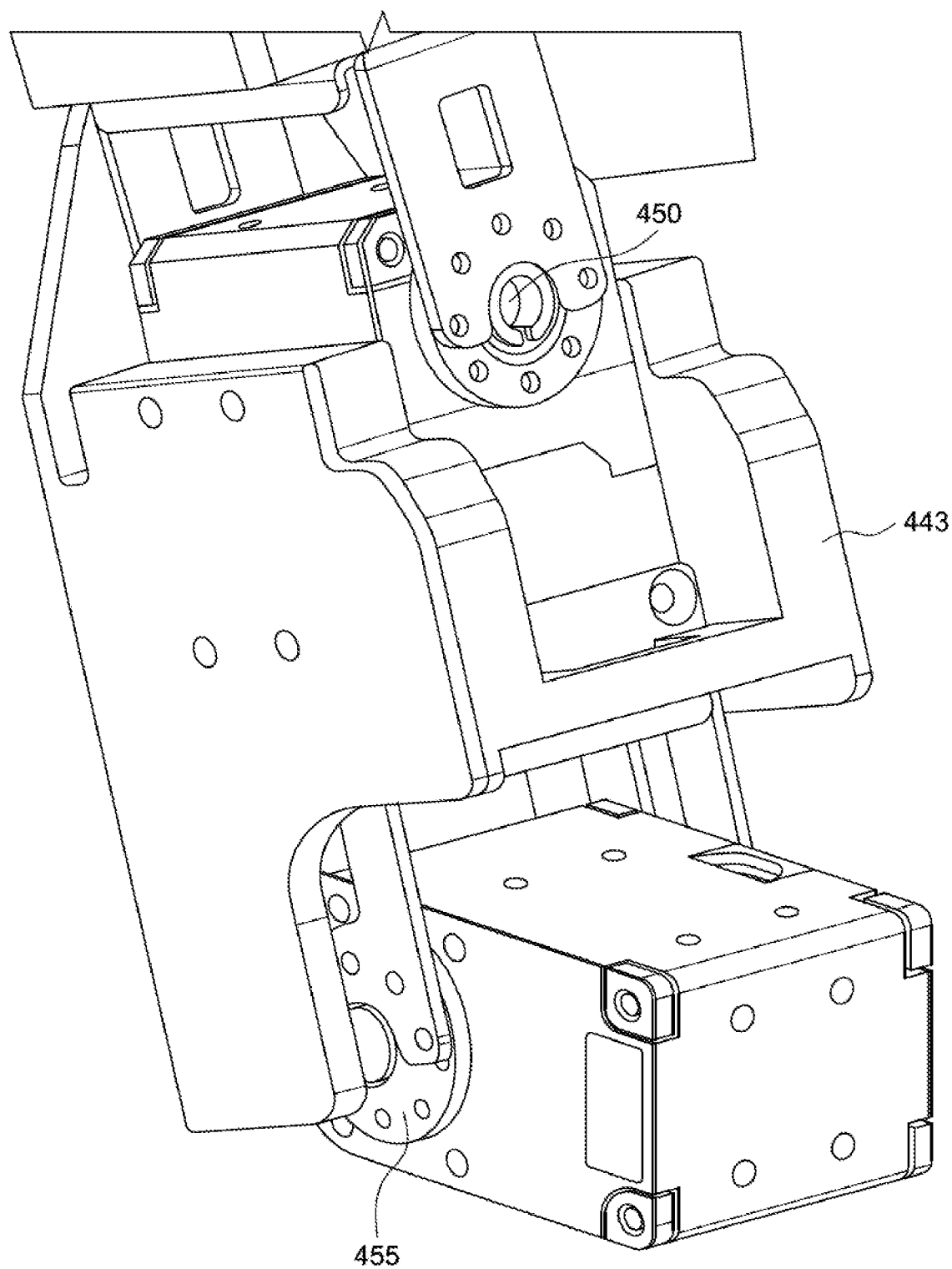
FIG. 26 is a perspective view of the pan and tilt actuators of the stereo camera of FIG. 25, according to an embodiment of the present disclosure.

With reference to FIG. 25, the stereo camera 430 includes the first camera 441 and the second camera 442, with the camera support 443, a connecting member 449, and a flange mounted camera support 460. The stereo camera 430 may further include an actuation system with at least one actuator. The stereo camera 430 may be articulated by linked actuators that pan and tilt the stereo camera 430. It may be beneficial to have at least two actuators, for example, a pan actuator 450 and a tilt actuator 455. The first camera 441 and second camera 442 may be connected at opposite ends of connecting member 449, with the connecting member 449 being pivotally coupled to the tilt actuator 450 at, for example, the midpoint of the connecting member 449. The connecting member 449 may be between, for example 6 and 10 inches in length (i.e., between the first camera 441 and second camera 442) and may be, for example, attachable to the surgical robot via an actuated or rigid mount. The biases of the first camera 441 and the second camera 442 may be adjusted prior to the surgical operation to obtain the field of view desired.

Referring to FIGS. 23 and 25, the flange mounted camera support 460 is shown connected to the flange 204 such that the stereo camera 430 extends in a superior direction from the flange 204, with the connection member 449 opposite the first joint 205. The camera support 443 includes a first end and a second end, with the tilt actuator 455 at the first end, such that the connecting member 449 is rotatably coupled to the tilt actuator 450 and may be, for example, laterally rotated about the coupling. The tilt actuator 450 may be able to rotate 360 degrees, however in most embodiments, the tilt of the connecting member 449 may be, for example, plus/minus 30 degrees from the longitudinal axis of the camera support 443. The second end of the camera support 443 is shown rotatably coupled to the pan actuator 455, with the pan actuator 455 fixed to the flange mounted camera support 460. The pan actuator 455 may, for example, rotate the camera support 443 sagittally at the second end of the camera support 443 and about the longitudinal axis of the camera support, thereby rotating the stereo camera 430 away from the first body part 217. The pan actuator 455 may be able to rotate the camera support 443 in excess of 180 degrees, however in most embodiments, the rotation will be, for example, 90 degrees or less sagittally from the vertical superior position relative to the flange 204. There may be embodiments where the first camera 441 and the second camera 442 can be fully articulated. There may also be other embodiments where more than two actuators are used to adjust the position of the stereo camera 430.

The tilt actuator 450 and the pan actuator 455 may be considered joints of the surgical robot 200. Thus, once the stereo camera 430 is mounted to the flange 204, the positions of the first camera 441 and the second camera 442 may be known, along with each camera's respective field of view. Calibration may be performed prior to the first use or as needed, to ensure that the respective camera field of view is correct. An encoder or encoders may be used to provide position data for the actual camera position during operation of the surgical robot 200. The actuators may, for example, also have encoders that control the actual actuator positions for more accurate measurement of the tracked targets. The combined tilt actuator 450 and the pan actuator 455 may, for example, center the field of view around a fixed target and/or minimize movement of calibrated stereo camera 430. For example, the first camera field of view 433 may have first camera field of view center 446 that remains fixed at a defined offset of about 10 percent to about 40 percent towards the second camera 442 or has offset movement minimized from the defined offset. For example, the second camera field of view 434 may have a second camera field of view center that remains fixed at a defined offset of about 10 percent to about 40 percent towards the first camera 441 or has offset movement minimized from the defined offset. The actuation system may, for example, use the encoders to provide motion control of the stereo camera 430, and to minimize shift in the field of view centers of the first camera 441 and the second camera 442. As the surgical robot 200 moves during the cut, the encoder may, for example, provides signals based on the motion of the stereo camera 430 to the tilt actuator 450 and the pan actuator 455, to adjust the position of the stereo camera 430, and thus the fields of view. Since the first camera 441 and the second camera 442 are connected to the connecting member 449 at opposite ends, the tilt actuator 450 tilts to adjust the lateral camera position, while the pan actuator 455 rotates or pans to adjust the camera position sagittally about the longitudinal axis of the camera support 443. As the surgical robot 200 moves through its defined cut path, the tilt actuator 450 and the pan actuator 455 may, for example, maintain the position or minimize movement of the stereo camera 430. The tilt actuator 450 and the pan actuator 455 may also for example, reposition the stereo camera 430 to maintain the fields of view centered on the desired position or minimizing movement of the field of view centers.

Figure 28:
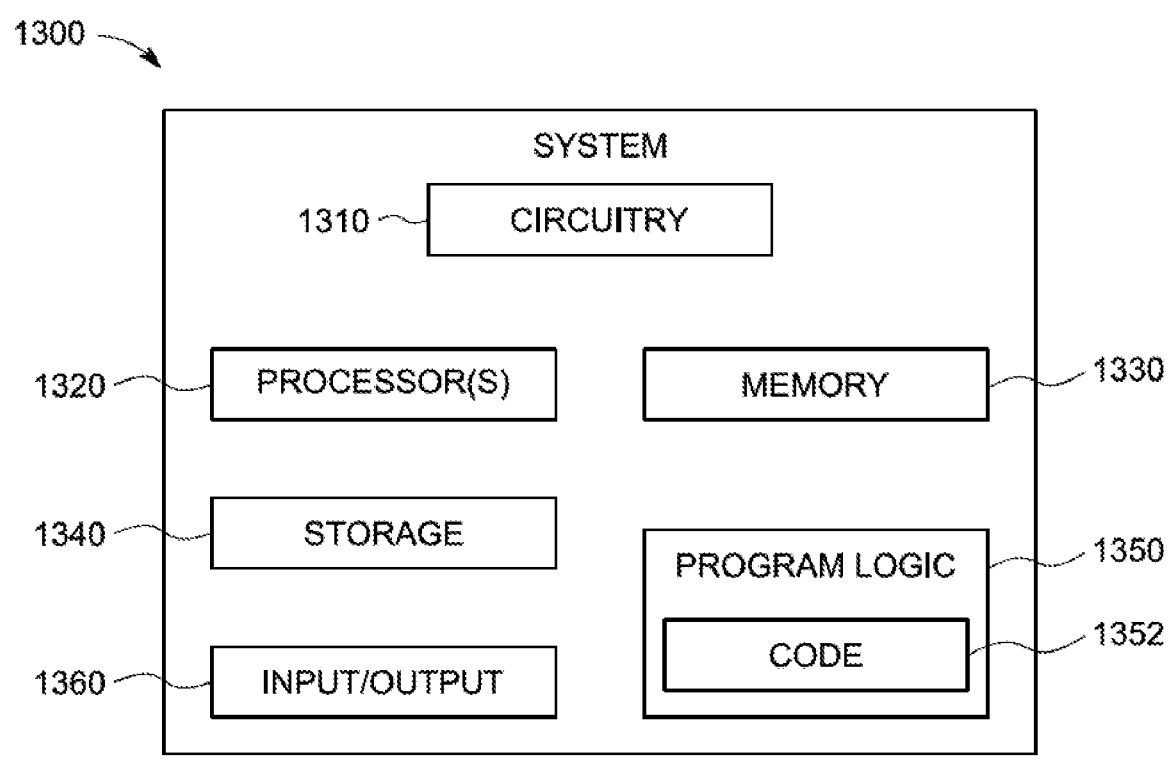
FIG. 28 is a block diagram of a control unit operable for use in the surgical robotic system, according to an embodiment of the present disclosure.

FIG. 28 illustrates a surgical method 900, according to an embodiment of the present disclosure. In this illustrated embodiment, the robotic surgical method 900 may include, at 910 tracking, via at least one camera attached to a robotic arm of a surgical robot, a surgical site of a patient, the robotic arm having a plurality of joints and a plurality of body parts, and at 920 controlling the robotic arm to perform a surgical procedure at the surgical site of the patient based on the camera tracked surgical site of the patient, and wherein the tracking comprises controlling the movement of the plurality of joints and body parts of the robotic arm to maintain a line of sight of the at least one camera directed towards the surgical site of the patient.

FIG. 28 illustrates a block diagram of a control unit 1300 operable for use in the surgical robotic system such as surgical robotic system 10 (FIG. 1), according to an embodiment of the present disclosure. System 1300 may include a circuitry 1310 that may in certain embodiments include a microprocessor 1320. The system 1300 may also include a memory 1330 (e.g., a volatile memory device), and storage 1340. The system 1300 may include a program logic 1350 including code 1352 that may be loaded into or stored in the memory 1330, the storage 1340, and/or circuitry 1310, and executed by the microprocessor 1320 and/or circuitry 1310. The various components may be operably coupled directly or indirectly via a system bus or may be coupled directly or indirectly to other data processing systems and components. The program logic 1350 may include the program code discussed above in this disclosure for use in forming or resecting a patient's femur.

As will be appreciated by one skilled in the art, aspects of the technique may be embodied as a system, method, or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system."

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. Each block in the flowchart or block diagrams may represent a module, segment, or portion of code, which includes one or more executable instructions for implementing the specified logical function(s).

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. For example, in a particular arrangement, a desktop or workstation computer may be employed using a commercially available operating system, e.g., Windows®, OSX®, UNIX or Linux based implementation.

As shown in FIG. 28, the computer readable storage medium 1340 may be, for example, but not limited to, an electronic, magnetic, optical, electromagnetic, infrared or semiconductor system, apparatus, or device, or any suitable combination of the foregoing. The storage 1340 may include an internal storage device, an attached storage device and/or a network accessible storage device. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

The computer program code for carrying out the operations for aspects of the present technique may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

As shown in FIG. 28, Input/output or I/O devices 1360 (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

A1. A robotic surgical device includes a robot mounted camera having a position and orientation relative to a fixed position on the robotic surgical device; a user interaction system comprising a control handle and a visual display; wherein the robotic surgical device is movable by the control handle; a marker mounted in a position within a work envelope; a processing circuit to transform an object viewable by the robot mounted camera relative to the marker into an object position and orientation data relative to the fixed position on the robotic surgical device; and a storage medium receiving the object position and orientation data from the processing circuit and having a database, for storing the object position and orientation data, with the object position and orientation data corresponding to an actual object position and orientation; wherein the actual object position and orientation are defined relative to the fixed position on the robotic surgical device, the robotic surgical device being interactable with the object. A2. The robotic surgical device of A1, wherein a second robot mounted camera is mounted to the fixed position.

B1. A computer program product includes: a non-transitory computer readable storage medium readable by a processing circuit and storing instructions for execution by the processing circuit for performing a method, the method comprising: deriving a position and orientation of a robot mounted camera relative to a fixed position on the surgical robot; using the robot mounted camera to capture an image of an object in proximity to a marker; using the image to calculate a position and orientation of the object relative to the marker; deriving from the image a position and orientation of the marker relative to the robot mounted camera; and deriving a position and orientation of the object relative to the fixed position on the surgical robot using the object position and orientation relative to the robot mounted camera, and the camera position and orientation relative to the fixed position. B2. The method of B1, wherein the step of using the robot mounted camera to capture the image is continuous.

C1. A method for localizing objects within a work envelope for a surgical robot includes: providing a robot mounted camera having a fixed and a calibrated position relative to a fixed position on the robotic surgical device; providing a marker mounted in a proximate position to a surgical site, the surgical site and the marker being within the work envelope; providing a control handle for moving the robotic surgical device; moving the robotic surgical device in proximity to the surgical site; using the robot mounted camera to capture an image of an object in proximity to the marker; using at least one processor configured with executable code on a machine readable media to transform the image of the object in proximity to the marker into a position and orientation of the object relative to the fixed position on the robotic surgical device; and storing the position and orientation of the object as position and orientation data of the object. C2. The method of C1, wherein the object is moved to different positions and orientations within the surgical site, the position and orientation data being gathered for each location of the object. C3. The method of C2, wherein the step of using the robot mounted camera to capture the image is continuous for each move of the object.

D1. A computer program product includes: a non-transitory computer-readable storage medium readable by a processing circuit and storing instructions for execution by the processing circuit for performing a method, the method comprising: using a robot mounted camera to capture an image of a first object in proximity to a marker; deriving from the image, the position and orientation of the first object relative to the marker; deriving from the image, the position and orientation of the marker relative to the robot mounted camera; using a fixed position mounted camera to capture an image of a second object; and deriving the first object position and orientation relative to a fixed position on the surgical robot using the first object position and orientation relative to the robot mounted camera, and the robot mounted camera position and orientation relative to the fixed position. D2. The method of D1, wherein the first object is moved to different positions and orientations within a surgical site, the positions and orientations being gathered for each location of the first object. D3. The method of claim D2, wherein the step of using the robot mounted camera to capture the image is continuous for each move of the first object. D4. The method of D3, wherein the step of capturing the image of the second object provides the position and orientation of the second object relative to the fixed position; wherein the second object is the robot mounted camera, and the position and orientation of the second object relative to the fixed position is used to refine the robot mounted camera positions and orientations relative to the fixed position on the surgical robot.

E1. A method for using a robot to perform a surgical procedure includes: making at least one incision to create a surgical site; exposing a bone; inserting a marker proximate to the surgical site; moving a robot mounted camera in proximity to the surgical site; using the robot mounted camera to identify the position and orientation data for the marker; placing an object on the bone; capturing an image of the object and the marker; deriving the position and orientation data of the object relative to the marker; deriving the position and orientation data of the marker relative to the robot mounted camera; providing the position and orientation data for the robot mounted camera relative to a fixed position; deriving the position and orientation data of the object relative to the fixed position; moving the object to a new position and orientation on the bone; repeating steps E1 until the bone has been mapped; and performing a surgical procedure using bone map data.

F1. A method for using a robot to perform a surgical procedure includes: making at least one incision to create a surgical site; exposing a bone; inserting a marker proximate to the surgical site; moving a robot mounted camera in proximity to the surgical site; using the robot mounted camera to identify position and orientation data for the marker; placing an object on the bone; moving the object along the surface of the bone to various positions and orientations; capturing a plurality of images of the object and the marker; deriving position and orientation data of the object relative to the marker; deriving position and orientation data of the marker relative to the robot mounted camera; providing position and orientation data for the robot mounted camera relative to a fixed position; deriving position and orientation data of the object relative to the fixed position; repeating steps F1 until the bone has been mapped; and performing a surgical procedure using bone map data.

G1. A robotic surgical device includes: a plurality of joints, a plurality of body parts, a base, and a flange; wherein the base is centered on a cartesian space, the cartesian space having an x-axis, a y-axis, and a z-axis; wherein the plurality of joints comprise a first joint, a second joint, a third joint, a fourth joint, a fifth joint, and a sixth joint; wherein each joint has a first end and a second end; wherein the plurality of body parts comprises a first body part, a second body part, a third body part, a fourth body part, a fifth body part, and a sixth body part; wherein each body part has a first end and a second end; wherein the sixth joint is rotatably connected to the base and movable about the z-axis at the sixth joint first end; the sixth joint further rotatably connected to the sixth body part at the sixth body part first end, with the sixth body part being rotatably movable relative to the base at the sixth joint second end; wherein the fifth joint, rotatably connected at the fifth joint first end to the sixth body part second end and rotatably connected at the fifth joint second end to the fifth body part first end; wherein the fifth body part and the sixth body part are rotatably movable relative to each other; wherein the fourth joint, rotatably connected at the fourth joint first end to the fifth body part second end and rotatably connected at the fourth joint second end to the fourth body part first end; wherein the fourth body part and the fifth body part are rotatably movable relative to each other; wherein the third joint, rotatably connected at the third joint first end to the fourth body part second end and rotatably connected at the third joint second end to the third body part first end; wherein the third body part and the fourth body part are rotatably movable relative to each other; wherein the second joint, rotatably connected at the second joint first end to the third body part second end and rotatably connected at the second joint second end to the second body part first end; wherein the second body part and the third body part are rotatably movable relative to each other; wherein the first joint, rotatably connected at the first joint first end to the second body part second end and rotatably connected at the first joint second end to the first body part first end; wherein the first body part and the second body part are rotatably movable relative to each other; wherein the first body part second end being rotatably connected to the flange, the flange being rotatable relative to the first body part; a camera, connected to the flange, the camera having a position and orientation relative to the cartesian space upon which the base is centered; a marker mounted within a work envelope; a processing circuit to transform objects viewable by the robotic mounted camera relative to the marker into object position and orientation data relative to the cartesian space upon which the base is centered; a storage medium having a database for storing object position and orientation data the object position and orientation data corresponding to actual object position and orientation; and wherein the actual object position and orientation are defined relative to the cartesian space upon which the base is centered, the robot is interactable with the object.

H1. A computer program product including: a non-transitory computer readable storage medium readable by a processing circuit and storing instructions for execution by the processing circuit for performing a method, the method comprising: deriving a position and orientation of a robot mounted camera relative to a fixed position on the surgical robot; using a movable robot mounted camera to capture a plurality of images of an object in proximity to a marker; using each image of the plurality of images to calculate a position and orientation of the object relative to the marker; deriving from each image of the plurality of images a position and orientation of the marker relative to the robot mounted camera; deriving a position and orientation of the object relative to the fixed position on the surgical robot using the object position and orientation relative to the robot mounted camera, and the camera position and orientation relative to the fixed position.

I1. A method for localizing objects within a work envelope for a robotic surgical device including: providing a robot mounted camera having a fixed and calibrated position relative to a fixed position on the robotic surgical device; providing a marker mounted in a proximate position to a surgical site, the surgical site and the marker being within the work envelope; the robotic surgical device having a defined cut path; using the robot mounted camera to capture a plurality of images of an object in proximity to the marker; using at least one processing circuit configured with executable code on a machine readable media to transform each image of the plurality of images of the object in proximity to the marker into a position and orientation of the object relative to the fixed position on the robotic surgical device; storing the position and orientation of the object as position and orientation data of the object; the robotic surgical device moving along the defined cut path; adjusting the position of the robot mounted camera to maintain the object within a field of view of the robot mounted camera.

J1. A robot mounted stereo camera includes: a first camera, a second camera, and a connecting member, the first camera and second camera being fixed on opposing ends of the connecting member; the first camera having a first field of view center axis and the second camera having a second field of view center axis; a camera support, connectable to a robot flange; an actuation system having a first end rotatably coupled to the camera support, and a second end rotatably coupled to the connecting member; and the actuation system being rotatably movable at the first end and the second end. J2. The robot mounted stereo camera of J1, wherein the actuation system is movable such that the first field of view center axis and second field of view center axis remain fixed.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The present disclosure has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the present disclosure be construed as including all such modifications and alterations.

As may be recognized by those of ordinary skill in the art based on the teachings herein, numerous changes and modifications may be made to the above-described and other embodiments of the present disclosure without departing from the scope of the disclosure. The projections, coupling segment, and other components of the device and/or system as disclosed in the specification, including the accompanying abstract and drawings, may be replaced by alternative component(s) or feature(s), such as those disclosed in another embodiment, which serve the same, equivalent or similar purpose as known by those skilled in the art to achieve the same, equivalent or similar results by such alternative component(s) or feature(s) to provide a similar function for the intended purpose. In addition, the devices and systems may include more or fewer components or features than the embodiments as described and illustrated herein. For example, the components and features of the present disclosure may all be used interchangeably and in alternative combinations as would be modified or altered by one of skill in the art. Accordingly, this detailed description of the currently-preferred embodiments is to be taken in an illustrative, as opposed to limiting of the invention.

The invention claimed is:

1. A surgical method comprising:
   tracking, via at least one camera attached to a robotic arm of a surgical robot, a surgical site of a patient, the robotic arm having a plurality of joints and a plurality of body parts;
   controlling the robotic arm to perform a surgical procedure at the surgical site of the patient based on the camera tracked surgical site;
   wherein the tracking comprises controlling movement of the plurality of joints and body parts of the robotic arm to maintain a line of sight of the at least one camera directed towards the surgical site of the patient;
   the at least one camera is mounted with a movable actuator to a portion of the robotic arm of the surgical robot; and
   the tracking comprises controlling the movement of the plurality of joints and body parts and controlling the movement of the movable actuator to maintain the line of sight of the at least one camera directed towards the surgical site of the patient with the at least one camera and movable actuator spaced from the patient and surgical site during the surgical procedure.

2. The surgical method of claim 1, wherein:
the controlling comprises controlling a tool attached to an end effector of the robotic arm of the surgical robot to perform the surgical procedure at the surgical site based on the camera tracked surgical site of the patient and a cut plan.

3. The surgical method of claim 1, further comprising:
modifying a cut plan based on the camera tracked surgical site of the patient; and wherein:
the controlling comprises controlling a tool attached to an end effector of the robotic arm of the surgical robot perform the surgical procedure at the surgical site of the patient based the modified cut plan.

4. The surgical method of claim 1, wherein:
the tracking comprises tracking, via a first camera attached to the robotic arm of the surgical robot and a second camera attached to the robotic arm of the surgical robot, the surgical site of the patient; and
the controlling comprises controlling the surgical robot to perform the surgical procedure at the surgical site of the patient based on a first camera tracked surgical site of the patient and a second camera tracked surgical site of the patient.

5. The surgical method of claim 1, wherein:
the tracking comprises tracking, via a pair of cameras attached to an end portion of the robotic arm of the surgical robot, the surgical site of the patient, and wherein a first of the pair of cameras comprises a first field of view of the surgical site of the patient, and a second of the pair of cameras comprises a second field of view of the surgical site of the patient, and the first field of view is different from said second field of view of the surgical site of the patient; and
the controlling comprises controlling the surgical robot to perform the surgical procedure at the surgical site of the patient based on the camera tracked surgical site of the patient based on a first camera tracked surgical site of the patient and a second camera tracked surgical site of the patient.

6. The surgical method of claim 1, wherein:
the tracking comprises tracking, via the at least one camera attached to the robotic arm of the surgical robot, an object in the surgical site of the patient; and
the controlling comprises controlling the surgical robot to perform the surgical procedure at the surgical site of the patient based on the camera tracked object in the surgical site of the patient.

7. The surgical method of claim 6, further comprising:
determining comprises determining the position and the orientation of the object based on the camera tracked object; and
the controlling comprises controlling the surgical robot to perform the surgical procedure at the surgical site of the patient based on the determined position and orientation of the camera tracked object in the surgical site of the patient.

8. The surgical method of claim 7 wherein:
the determining comprises determining a position and an orientation of the object based on the camera tracked object and registration to three-dimensional data of the object, and the controlling comprises controlling the surgical robot to perform the surgical procedure at the surgical site of the patient based on the determined position and orientation of the camera tracked object registered to the three-dimensional data of the object in the surgical site of the patient.

9. The surgical method of claim 7, wherein:
the determining comprises continuously determining the position and the orientation of the object during the surgical procedure based on the camera tracked object and registration to three-dimensional data of the object, and wherein:
the controlling comprises controlling the surgical robot to perform the surgical procedure at the surgical site of the patient based on the continuously determined position and orientation of the camera tracked object in the surgical site of the patient during the surgical procedure.

10. The surgical method of claim 6, wherein:
the object comprises a bone of the patient, and the controlling comprises controlling the surgical robot to perform a resection or an excavation of the bone of the patient; or
the object comprises a retractor, and the controlling comprises controlling the surgical robot to perform the surgical procedure and avoid contact with the retractor.

11. The surgical method of claim 1, wherein:
the tracking comprises tracking, via the at least one camera attached to the robotic arm of the surgical robot, at least one marker attached to an object in the surgical site of the patient; and
the controlling comprises controlling the surgical robot to perform the surgical procedure at the surgical site of the patient based on the camera tracked marker attached to the object in the surgical site of the patient.

12. The surgical method of claim 11, further comprising:
determining a position and an orientation of the object based on the camera tracked marker attached to the object, and wherein:
the controlling comprises controlling the surgical robot to perform the surgical procedure at the surgical site of the patient based on the determined position and orientation of the object in the surgical site of the patient.

13. The surgical method of claim 11, further comprising:
determining a position and an orientation of the object based on the camera tracked marker and registration to three-dimensional data of the object, and wherein:
the controlling comprises controlling the surgical robot to perform the surgical procedure at the surgical site of the patient based on the determined position and orientation of the camera tracked object marker registered to the three-dimensional data of the object in the surgical site of the patient.

14. The surgical method of claim 11, wherein:
the object comprises a bone of the patient, and the controlling comprises controlling the surgical robot to perform a resection or an excavation of the bone of the patient; or
the object comprises a retractor, and the controlling comprises controlling the surgical robot to perform the surgical procedure and avoid contact with the retractor.

15. The surgical method of claim 11, wherein the at least one camera comprises at least one infrared camera, and the at least one marker comprises and an active LED marker.

16. The surgical method of claim 1, wherein:
the tracking comprises tracking, via the at least one camera attached to the robotic arm of the surgical robot, an object in the surgical site of the patient; and further comprising:

determining a position and an orientation of the object based on the camera tracked object;
generating a modified cut plan based on a predetermined cut plan and the determined position and orientation of the camera tracked object in the surgical site of the patient; and
the controlling comprises controlling a tool attached to an end effector of the robotic arm of the surgical robot to perform the surgical procedure at the surgical site based a modified cut plan.

17. The surgical method of claim 16, wherein:
the tracking comprises tracking, via the at least one camera attached to the robotic arm of the surgical robot, at least one marker attached to the object in the surgical site of the patient;
the determining comprises determining a position and an orientation of the object based on the camera tracked marker; and
the controlling comprises controlling the surgical robot to perform the surgical procedure at the surgical site of the patient based on the determined position and orientation of the camera tracked marker attached to the object in the surgical site of the patient.

18. The surgical method of claim 1, wherein the at least one camera is operably attached to:
a flange adjacent to the end effector of the robotic arm; or
a joint of the robotic arm; or
a base of the surgical robot.

19. A surgical robotic system comprising:
a robot comprising a robotic arm having an end effector, the robotic arm having a plurality of joints and plurality of body parts;
at least one camera operably attached to said robotic arm;
a controller comprising a memory, one or more processors in communication with the memory, and program instructions executable by the one or more processors via the memory to perform a method, the method comprising:
tracking, via at least one camera attached to the robotic arm of the surgical robot;
controlling the robotic arm to perform a surgical procedure at the surgical site of the patient based on the camera tracked surgical site of the patient; and
wherein the tracking comprises controlling movement of the plurality of joints and body parts of the robotic arm to maintain a line of sight of the at least one camera directed towards the surgical site of the patient; and
the at least one camera is mounted with a movable actuator to a portion of the robotic arm of the surgical robot; and
the tracking comprises controlling the movement of the plurality of joints and body parts and controlling the movement of the movable actuator to maintain a line of sight of the at least one camera directed towards the surgical site of the patient with the at least one camera and movable actuator spaced from the patient and surgical site during the surgical procedure.

20. The surgical robotic system of claim 19, wherein said at least one camera comprises a plurality of cameras attached to the robotic arm of the surgical robot.

21. The surgical robotic system of claim 20, wherein said plurality of cameras is attached to a flange of the robotic arm of the surgical robot, a first of the cameras comprises a first field of view of the surgical site of the patient, and a second of the cameras comprises a second field of view of the surgical site, and the first field of view is different from said second field of view of the surgical site.

22. The surgical robotic system of claim 19, wherein:
the at least one camera comprises at least one RGB-D camera; or
the at least one camera comprises at least one infrared camera.

23. The surgical robotic system of claim 19, wherein the at least one camera is attached to:
a flange adjacent to the end effector of the robotic arm; or
a joint of the robotic arm; or
a base of the surgical robot.

24. The surgical robotic system of claim 19, wherein the at least one camera comprises a first camera attached to a flange adjacent to the end effector of the robotic arm, a second camera is attached to a joint of the robotic arm, and a third camera attached to a base of the surgical robot.

25. The surgical robotic system of claim 19, wherein the method further comprises:
the controlling comprising controlling a tool attached to an end effector of the robotic arm of the surgical robot to perform the surgical procedure at the surgical site based on the camera tracked surgical site of the patient and a predetermined cut plan.

26. The surgical robotic system of claim 19, wherein the method further comprises:
generating a modified cut plan based on a predetermined cut plan and the camera tracked surgical site of the patient; and wherein:
the controlling comprises controlling a tool attached to an end effector of the robotic arm of the surgical robot to perform the surgical procedure at the surgical site based the modified cut plan.

27. The surgical robotic system of claim 19, wherein the method further comprises:
the tracking comprises tracking, via the at least one camera attached to the robotic arm of the surgical robot, an object in the surgical site of the patient;
the controlling comprises controlling the surgical robot to perform the surgical procedure at the surgical site of the patient based on the camera tracked object in the surgical site of the patient.

28. The surgical robotic system of claim 27, wherein:
the object comprises a bone and the controlling comprises controlling the surgical robot to perform a resection or an excavation of the bone of the patient; or
the object comprises a retractor, and the controlling comprises controlling the surgical robot to perform the surgical procedure and avoid contact with the retractor.

29. The surgical robotic system of claim 19, wherein the method further comprises:
determining a position and an orientation of an object based on the camera tracked marker attached to the object, and wherein:
the controlling comprises controlling the surgical robot to perform the surgical procedure at the surgical site of the patient based on the determined position and orientation of the camera tracked object in the surgical site of the patient.

30. The surgical robotic system of claim 19, wherein the method comprises:
the tracking comprises tracking, via the at least one camera attached to the robotic arm of the surgical robot, an object in the surgical site of the patient; and further comprising:
determining a position and an orientation of the object based on the camera tracked object;

generating a modified cut plan based on a predetermined cut plan and the determined position and orientation of the camera tracked object in the surgical site of the patient; and wherein:

the controlling comprises controlling a tool attached to an end effector of the robotic arm of the surgical robot to perform the surgical procedure at the surgical site based on a modified cut plan.

31. The surgical robotic system of claim 19, wherein:

the tracking comprises tracking, via the at least one camera attached to the robotic arm of the surgical robot, at least one marker attached to the object in the surgical site of the patient;

the determining comprises determining a position and an orientation of the object based on the camera tracked marker; and the controlling comprises controlling the surgical robot to perform the surgical procedure at the surgical site of the patient based on the determined position and orientation of the camera tracked marker attached to the object in the surgical site of the patient.

32. The surgical robotic system of claim 19, wherein the at least one camera is movably mounted relative to the robotic arm of the surgical robot, and wherein:

the tracking comprises tracking, via moving the at least one camera differently from movement of the robotic arm of the surgical robot, the surgical site of the patient;

the controlling comprises controlling the surgical robot to perform a surgical procedure at the surgical site of the patient based on the moving camera tracked surgical site of the patient.

33. A computer program product comprising a non-transitory computer readable storage medium readable by a processing circuit and storing instructions for execution by the processing circuit for performing a method, the method comprising:

tracking, via at least one camera attached to a robotic arm of a surgical robot, a surgical site of a patient;

controlling the surgical robot to perform a surgical procedure at the surgical site of the patient based on the camera tracked surgical site of the patient; and wherein:

the at least one camera is mounted with a movable actuator to a portion of the robotic arm of the surgical robot; and the tracking comprises controlling the movement of the plurality of joints and body parts and controlling the movement of the movable actuator to maintain a line of sight of the at least one camera directed towards the surgical site of the patient with the at least one camera and movable actuator spaced from the patient and surgical site during the surgical procedure.

34. The computer program product of claim 33, wherein the method comprises:

the tracking comprises tracking, via the at least one camera attached to the robotic arm of the surgical robot, an object in the surgical site of the patient; and further comprising:

determining a position and an orientation of the object based on the camera tracked object;

generating a modified cut plan based on a predetermined cut plan and the determined position and orientation of the camera tracked object in the surgical site of the patient; and wherein:

the controlling comprises controlling a tool attached to an end effector of the robotic arm of the surgical robot to perform the surgical procedure at the surgical site based on the modified cut plan.

35. The computer program product of claim 33, wherein the at least one camera is movable mounted relative to the robotic arm of the surgical robot, and wherein:

the tracking comprises tracking, via moving the at least one camera differently from the movement of the robotic arm of the surgical robot, the surgical site of the patient;

the controlling comprises controlling the surgical robot to perform a surgical procedure at the surgical site of the patient based on the moving camera tracked surgical site of the patient; and wherein the tracking comprises controlling the movement of the plurality of joints and body parts of the robotic arm to maintain a line of sight of the at least one camera directed towards the surgical site of the patient.

* * * * *